(12) United States Patent
Kuze et al.

(10) Patent No.: US 8,979,330 B2
(45) Date of Patent: Mar. 17, 2015

(54) ANISOTROPIC LIGHT-DIFFUSING FILM, ANISOTROPIC LIGHT-DIFFUSING LAMINATE, ANISOTROPIC LIGHT-REFLECTING LAMINATE, AND USE THEREOF

(75) Inventors: Katsuaki Kuze, Ohtsu (JP); Kenji Kawai, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 481 days.

(21) Appl. No.: 13/056,270

(22) PCT Filed: Aug. 6, 2009

(86) PCT No.: PCT/JP2009/063970
§ 371 (c)(1),
(2), (4) Date: Jan. 27, 2011

(87) PCT Pub. No.: WO2010/016557
PCT Pub. Date: Feb. 11, 2010

(65) Prior Publication Data
US 2011/0128628 A1      Jun. 2, 2011

(30) Foreign Application Priority Data

Aug. 7, 2008  (JP) ................ 2008-204133
Dec. 22, 2008 (JP) ................ 2008-325459
Dec. 26, 2008 (JP) ................ 2008-332427
Dec. 26, 2008 (JP) ................ 2008-332435

(51) Int. Cl.
*F21V 11/00*       (2006.01)
*B32B 15/08*       (2006.01)
(Continued)

(52) U.S. Cl.
CPC ............ *G02B 5/0236* (2013.01); *G02B 5/0257* (2013.01); *G02F 1/133504* (2013.01); *G02F 1/133553* (2013.01)
USPC ............ 362/355; 428/461; 428/515; 525/240

(58) Field of Classification Search
USPC .................... 428/461, 515; 362/355; 525/240
See application file for complete search history.

(56) References Cited

U.S. PATENT DOCUMENTS

| | | |
|---|---|---|
| 2005/0068759 A1 | 3/2005 | Takemoto et al. |
| 2006/0204744 A1 | 9/2006 | Hiraishi et al. |

(Continued)

FOREIGN PATENT DOCUMENTS

| | | |
|---|---|---|
| JP | 11-231111 A | 8/1999 |
| JP | 2002-192608 A | 7/2002 |

(Continued)

OTHER PUBLICATIONS

International Standards Organization (ISO) and Commission Internationale De L'Eclairage (CIE), Joint ISO/CIE Standard of ISO 11664-2:2007(E) / CIE S 014-2/E:2006, pp. i-vii and 1-2 (Nov. 1, 2008).

(Continued)

*Primary Examiner* — Kevin R Kruer
(74) *Attorney, Agent, or Firm* — Leydig, Voit & Mayer, Ltd.

(57) ABSTRACT

An anisotropic light-diffusing film, an anisotropic light-diffusing laminate, and an anisotropic light-reflecting laminate are provided which are excellent in both light transmittance and diffusivity. Also provided are a lighting equipment and a display device which employ any of the film and laminates and are excellent in light-diffusivity and brightness and in economy, etc. The anisotropic light-diffusing film is a film formed by melt-extruding a mixture of at least two thermoplastic resins incompatible with each other. The film has parallel light ray transmittance of 20-85%, haze of 10-80%, glossiness of 10-70%, and ratio of the vertical-direction diffusivity to the horizontal-direction diffusivity of transmitted light of 1.3-6.0. The anisotropic light-reflecting laminate comprises a light reflector and the anisotropic light-diffusing film laminated over at least one surface of the reflector. In the laminate, diffusivity ratio, reflectivity and diffusivity of reflected light satisfy respective specific ranges.

15 Claims, 3 Drawing Sheets

(51) Int. Cl.
*B32B 27/08* (2006.01)
*C08L 23/00* (2006.01)
*G02B 5/02* (2006.01)
*G02F 1/1335* (2006.01)

(56) References Cited

U.S. PATENT DOCUMENTS

| | | |
|---|---|---|
| 2006/0209526 A1 | 9/2006 | Miyauchi |
| 2007/0279740 A1 | 12/2007 | Mi et al. |
| 2008/0310171 A1 | 12/2008 | Hiraishi et al. |

FOREIGN PATENT DOCUMENTS

| | | |
|---|---|---|
| JP | 2002-197909 A | 7/2002 |
| JP | 2003-043258 A | 2/2003 |
| JP | 2004-219437 A | 8/2004 |
| JP | 2004-302071 A | 10/2004 |
| JP | 2004-361656 A | 12/2004 |
| JP | 2005-011477 A | 1/2005 |
| JP | 2006-078743 A | 3/2006 |
| JP | 2006-251395 A | 9/2006 |
| JP | 2006-318724 A | 11/2006 |
| JP | 2007-010798 A | 1/2007 |
| JP | 2007-079298 A | 3/2007 |
| JP | 2007-157566 A | 6/2007 |
| JP | 2007-196682 A | 8/2007 |
| JP | 2007-206569 A | 8/2007 |
| WO | WO 2003/034103 A1 | 4/2003 |
| WO | WO 2004/090587 A1 | 10/2004 |
| WO | WO 2008/090821 A1 | 7/2008 |

OTHER PUBLICATIONS

Mitsui Chemicals America, Inc., Technical Information on NOTIO™ Nano-crystal Structure Controlled Elastomer [retrieved from http://www.mitsuichemicals.com/notio.htm on May 22, 2014].

Murakami Color Research Laboratory Co. Ltd., Technical Information on Murakami Color Research Laboratories Photometer Model GP-200 (2008) [retrieved from http://www.mcrl.co.jp/english/GP200.html on Feb. 22, 2014].

European Patent Office, Supplementary European Search Report in European Patent Application No. 09 80 5040 (May 30, 2014).

ANISOTROPIC LIGHT-DIFFUSING FILM, ANISOTROPIC LIGHT-DIFFUSING LAMINATE, ANISOTROPIC LIGHT-REFLECTING LAMINATE, AND USE THEREOF

CROSS-REFERENCE TO RELATED APPLICATIONS

This patent application is the U.S. national phase of International Patent Application No. PCT/JP2009/063970, filed Aug. 6, 2009, which claims the benefit of Japanese Patent Application No. 2008-332435, filed Dec. 26, 2008, Japanese Patent Application No. 2008-332427, filed Dec. 26, 2008, Japanese Patent Application No.2008-325459 filed Dec. 22, 2008, and Japanese Patent Application No. 2008-2040433, filed Aug. 7, 2008.

TECHNICAL FIELD

The present invention relates to an anisotropic light-diffusing film, and use thereof. Specifically, the invention relates to an anisotropic light-diffusing film which has the so-called anisotropic light reflectivity and is excellent in both of light transmittance and light diffusivity; an anisotropic light-diffusing laminate wherein the film and a plastic sheet are laminated onto each other; an anisotropic light-reflecting laminate wherein the film and a light reflector containing a metallic layer are laminated onto each other; and a lighting equipment and a display device each using any one of these members.

BACKGROUND ART

About liquid crystal display devices, a backlight type, in which a liquid crystal layer is irradiated from the rear surface side thereof so as to make the liquid crystal layer luminous, has been spreading. At the lower surface side of the liquid crystal layer, a backlight unit is arranged. This backlight unit is classified into an edge light type and a direct type. Even when any one of these types is adopted, the brightness distribution of light rays emitted therefrom is varied between a case where the distribution is viewed along a direction perpendicular to its linear lamp and a case where the distribution is viewed along a direction parallel thereto. In general, the brightness distribution along the direction perpendicular to the lamp exhibits a stronger peak while the brightness distribution in the direction parallel to the lamp is relatively bilaterally-symmetric and even, and less exhibits a peak in a specific direction.

On the other hand, about light-diffusing films of a bead-painted type or embossed type, the diffusivity thereof is even over all directions so as to have isotropy. Thus, it is not possible to make a control so as to remove a difference between the brightness distribution of light rays emitted as described above along the front and back direction and that along the right and left direction.

In order to correct imbalance between the brightness distributions, it has been desired to develop an anisotropic light-diffusing film different between the light diffusivity in the front and back direction and that in the right and left direction, and various techniques have been disclosed.

In many of the disclosed techniques, importance is attached to diffusivity (or scattering property; hereinafter, in the invention, diffusivity or scattering property will be consistently referred to as diffusivity). Anisotropic light-diffusing films are restricted to films covering a high haze region, or a low parallel light ray transmittance region.

For example, Patent Literature 1 or the like is known as a disclosed technique wherein the haze is restricted into a high-haze region of 85% or more in the claims thereof or the examples thereof.

Patent Literature 2 or the like is known as a disclosed technique wherein the parallel light ray transmittance is restricted into a low region in the claims thereof or the examples thereof.

By contrast, Patent Literature 3 is known as a disclosed technique wherein the haze is restricted into a low-haze region of 15% or less in the examples thereof.

Patent Literatures 4 and 5 are each disclosed as a technique wherein the haze is restricted into a middle-haze region in the examples thereof.

However, in the technique disclosed in Patent Literature 4, the film thereof is formed from a solution; thus, the technique is disadvantage from the viewpoint of economical efficiency and load onto the environment.

In the technique disclosed in Patent Literature 5, spherical silica particles are used as dispersed phases. Thus, in the process for forming the film, the clogging of a polymer filter is increased. As a result, the technique has a problem that a fine filter is not easily used and the resultant optically anisotropic film is low in clearness.

In a technique disclosed in Patent Literature 6, optical anisotropy is given by embossing. Thus, the technique is disadvantageous for economical efficiency in the same way as the above-mentioned techniques.

Patent Literature 7 is disclosed as a technique wherein the glossiness is restricted into a middle-glossiness region in the examples thereof. However, in the technique disclosed in Patent Literature 7, an acrylic resin, which is an amorphous resin, is used as a continuous phase resin. The resultant optically anisotropic film has a problem that the film is poor in solvent-resistance. Furthermore, silicone crosslinked beads are used as dispersed phases. Thus, in the process for forming the film, the clogging of a polymer filter is increased. As a result, the technique has a problem that a fine filter is not easily used and the resultant optically anisotropic film is low in clearness.

Moreover, disclosed are many techniques in each of which general optical properties, such as the haze or the parallel light ray transmittance, are not clearly described (e.g. Patent Literatures 8 to 11).

These disclosed techniques are based on a technique similar to the above-mentioned patents, wherein importance is attached to diffusivity. In many of the techniques, it is presumed that an optically anisotropic film covering a high haze region is obtained.

Furthermore, for example, in a technique disclosed in Patent Literature 8, the film thereof is produced from a solution. Thus, the technique is disadvantageous from the viewpoint of economical efficiency and load onto the environment.

In a technique disclosed in Patent Literature 9, porous acrylic particles are used as dispersed phases. Thus, in the process for forming the film, the clogging of a polymer filter is increased. As a result, the technique has a problem that a fine filter is not easily used and the resultant optically anisotropic film is low in clearness.

In a technique disclosed in Patent Literature 10, an amorphous resin is used as a resin which forms a continuous phase, examples of the resin including an ultra low density polyethylene resin, an amorphous co-polymeric polyester resin and a polystyrene resin. The technique has a problem that the resultant optically anisotropic film is poor in solvent-resistance.

In a technique disclosed in Patent Literature 11, a compatibility accelerator containing an epoxy group, which is high in reactivity, is used. Thus, the technique has a problem that in a film-forming process, crosslinking reaction is caused so that the clearness of the resultant optically anisotropic film declines.

In lighting inside a room or the like, lighting in an internal-lighting type illumination panel, light radiation in a copying machine, lighting in a liquid crystal display device, or the like, a light-reflecting sheet or light-reflecting plate, which may be referred to merely as a light reflector hereinafter, is used to make effective use of the quantity of light from a light source and heighten the illuminance or brightness of the lighting.

As the light reflector, for example, a diffusive reflecting member made of a white PET film is frequently used. The diffusive reflecting member has a property wherein importance is attached to diffusivity, and the member is low in positive reflectivity. Thus, the member gives reflectivity high in evenness; however, the member has a problem that the reflectivity is low.

On the other hand, as a method for solving the problem, a reflector has been developed wherein the luster of a metal such as aluminum or silver is used to give a high positive reflectivity. Although the method makes the reflectivity high, the directivity of the reflection is high. Thus, in indoor lighting or office lighting, a strong reflection is caused in a specific direction. Therefore, the method has problems that the reflection is short of uniformity over directions and further an intense glaringness is caused in the specific direction. The method also has a problem that the uniformity of the brightness deteriorates in lighting in an internal-lighting type illumination panel, or lighting in a liquid crystal display device. Furthermore, the method has a problem that when the reflector is partially wrinkled or warped, the uniformity of the reflection further deteriorates since the directivity of the reflection is intense.

As a method for solving the problems, suggested is a method of laminating a diffusion layer for controlling the diffusivity of light onto a surface of a light reflector using metallic luster, thereby controlling the diffusivity of reflection thereon.

However, the suggested technique is restricted to two extreme regions, which are regions wherein the light transmittance of the diffusion layer is high and wherein the transmittance is in reverse low.

As a method restricted to the high-light-transmittance region, for example, Patent Literature 12 is known.

According to the method disclosed in the Patent Literature 12, the diffusivity is improved more than any light reflector merely using metallic luster. However, the method still gives an intense directivity, and does not solve the problems which are possessed by the reflecting sheet using metallic luster.

On the other hand, as a method restricted to the low-light-transmittance region, for example, Patent Literature 13 is known.

According to the method disclosed in the Patent Literature 13, the diffusivity is largely improved. However, the positive reflectivity thereof is largely lowered. Thus, the method has the same problem as that of the light reflector made of a white reflecting film.

On the other hand, as a method for giving anisotropy of light reflection, which may be referred to merely as anisotropy hereinafter, to a light-reflecting laminate composed of a light reflector containing a metallic layer and a light-diffractive layer, disclosed is a method of subjecting a metallic layer surface to hair line processing (see Patent Literature 14).

The method may not give sufficient anisotropy. Moreover, the method has a problem that a homogeneous product is not easily obtained since an even processing is not easily attained.

As another method for giving anisotropy, disclosed is a method of combining a lens sheet or prism sheet with a light reflector containing a metallic layer (e.g. see Patent Literature 15).

The method disclosed in the patent literature is disadvantageous for economical efficiency since the lens sheet or prism sheet is expensive.

Patent Literature 15 refers to a method wherein a light reflector containing a metallic layer is combined in the text thereof. However, an example of the method is never demonstrated in examples. According to the method of the Patent Literature 15, a light-diffusing layer is made of a white reflecting film. It is presumed that even when the light-diffusing layer is combined with the light reflector containing a metallic layer, an improvement in the reflectivity is small.

Disclosed is also a method of giving anisotropy to a white reflecting film by hair line processing (see Patent Literature 16).

The method disclosed in the patent literature has a problem that a light reflector is the white reflecting film so that an excellent diffusivity is generated while the reflectivity is low.

In recent years, because of problems of global warming and the exhaustion of resources, the request of energy saving has been becoming intense also in the above-mentioned lighting field.

For example, a liquid crystal display device is used in the display section of a clock, a calculator, a TV, a personal computer, or the like at present while making good use of advantageous characteristics thereof, for example, characteristics that the display is thin, small and low in consumption power. Furthermore, in recent years, color LCDs have been developed, and the use thereof has been starting for many articles such as a car navigation system, a view finder and a monitor of a personal computer, these articles being mainly OA and AV machines. It is expected that markets therefor will rapidly expand hereafter. In particular, about reflective liquid crystal display devices, wherein incident light from the outside is reflected to attain display, no backlight is required so that consumption power is small and further the displays can be made thin and light. Thus, attention has been paid to the displays for the purpose of being used as portable terminals.

In the case of the reflective liquid crystal display devices, it is known that in the case of using the displays as portable terminals, it is preferred that high is the reflectivity thereof to light rays each having an incidence angle within ±20 degrees to their reflecting sheet. A higher-performance anisotropic light-reflecting sheet has been desired.

PRIOR ART LITERATURES

Patent Literatures

Patent Literature 1: Japanese Patent Application Laid-Open (JP-A) No. 2002-192608
Patent Literature 2: WO 03/034103
Patent Literature 3: Japanese Patent Application Laid-Open (JP-A) No. 2002-197909
Patent Literature 4: Japanese Patent Application Laid-Open (JP-A) No. 2004-302071
Patent Literature 5: Japanese Patent Application Laid-Open (JP-A) No. 2002-197909
Patent Literature 6: Japanese Patent Application Laid-Open (JP-A) No. 2006-78743
Patent Literature 7: WO 2004/090587

Patent Literature 8: Japanese Patent Application Laid-Open (JP-A) No. 2004-361656
Patent Literature 9: Japanese Patent Application Laid-Open (JP-A) No. 2003-43258
Patent Literature 10: Japanese Patent Application Laid-Open (JP-A) No. 2007-10798
Patent Literature 11: Japanese Patent Application Laid-Open (JP-A) No. 2006-251395
Patent Literature 12: Japanese Patent Application Laid-Open (JP-A) No. 2007-157566
Patent Literature 13: Japanese Patent Application Laid-Open (JP-A) No. 2005-11477
Patent Literature 14: Japanese Patent Application Laid-Open (JP-A) No. 23111/99
Patent Literature 15: Japanese Patent Application Laid-Open (JP-A) No. 2006-318724
Patent Literature 16: Japanese Patent Application Laid-Open (JP-A) No. 2004-219437

SUMMARY OF THE INVENTION

Problem that the Invention is to Solve

An object of the invention is to solve the problems in the prior art, and to provide an anisotropic light-diffusing film, an anisotropic light-diffusing laminate, and an anisotropic light-reflecting laminate which are each excellent in both properties of light transmittance and diffusivity, and are each also excellent in properties other than optical properties, such as economical efficiency, solvent-resistance, and clearness; and a lighting equipment and a display device wherein one or more of these are used to give excellent light diffusivity and brightness, and further give excellent economical efficiency, and other properties.

Means for Solving the Problem

In light of the above-mentioned situation, the present invention has been made. The present invention is as follows:
1. An anisotropic light-diffusing film which is obtained by melt-extruding a mixture containing at least two thermoplastic resins incompatible with each other and comprises a structure containing a continuous phase and dispersed phases, and/or a co-continuous-phase structure, wherein the parallel light ray transmittance of the film is from 20 to 85%, the haze of the film is from 10 to 80%, the glossiness of the film is from 10 to 70%, and further the transmitted light diffusivity ratio of the film is from 1.3 to 6.0, the ratio (DTv/DTh) being the ratio of the diffusivity of transmitted light (DTv) which is measured with an angle-variable photometer when the incidence angle is set to 60 degrees in the state where a sample is fixed to set the orientation direction of the dispersed phases or the co-continuous-phase of the film to the vertical direction to the diffusivity of transmitted light (DTh) measured in the above-mentioned same manner in the state where the sample is fixed to set the orientation direction of the dispersed phases or the co-continuous-phase of the film to the horizontal direction.
2. The anisotropic light-diffusing film according to item 1, wherein the DTv, and the transmittance (T%v) of the film which is measured in the state where the sample is fixed to set the orientation direction of the dispersed phases or the co-continuous-phase of the film to the vertical direction satisfy the following expression (1) or (2):

$$60 < DTv \leq 120, 10 \leq T\%v \leq 90 \quad (1)$$

$$35 \leq DTv \leq 60, -3.2 \times DTv + 203 \leq T\%v \leq 90 \quad (2)$$

3. The anisotropic light-diffusing film according to item 1 or 2, wherein one of the at least two thermoplastic resins is a crystalline resin.
4. The anisotropic light-diffusing film according to item 3, wherein the crystalline resin comprises a polypropylene resin.
5. The anisotropic light-diffusing film according to item 3, wherein the crystalline resin comprises a polyester resin.
6. The anisotropic light-diffusing film according to any one of items 3 to 5, wherein one of the at least two thermoplastic resins comprises a polyolefin resin containing ethylene and/or butene.
7. The anisotropic light-diffusing film according to any one of items 1 to 4, wherein the mixture, which contains the at least two thermoplastic resins, comprises a blend of a polypropylene resin (A), a polyolefin resin (B) containing ethylene and/or butene, and a nanocrystal-structure-controlled polyolefin elastomer resin (C).
8. An anisotropic light-diffusing laminate, comprising: the anisotropic light-diffusing film as recited in any one of items 1 to 7; and a plastic sheet which is laminated over the film and has a thickness of 0.1 to 5 mm and a total light ray transmittance of 80 to 100%.
9. An anisotropic light-reflecting laminate, comprising a light reflector containing a metallic layer, and the anisotropic light-diffusing film as recited in any one of items 1 to 7 which is laminated over at least one surface of the light reflector, wherein the reflected light diffusiveity ratio of the laminate is from 1.3 to 10, the ratio (DRv/DRh) being the ratio of the diffusivity of reflected light (DRv) which is measured with an angle-variable photometer when the incidence angle is set to 15 degrees in the state where a sample is fixed to set the orientation direction of the dispersed phases or the co-continuous-phase of the film to the vertical direction to the diffusivity of reflected light (DRh) measured in the above-mentioned same manner in the state where the sample is fixed to set the orientation direction of the dispersed phases or the co-continuous-phase of the film to the horizontal lateral direction; and the reflectivity and the diffusivity of the diffusing film side of the laminate are from 0.5 to 8 and from 10 to 30, respectively.
10. A lighting equipment, comprising the anisotropic light-diffusing film as recited in any one of items 1 to 7, the anisotropic light-diffusing laminate as recited in item 8, and/or the anisotropic light-reflecting laminate as recited in item 9.
11. A display device, comprising the anisotropic light-diffusing film as recited in any one of items 1 to 7, the anisotropic light-diffusing laminate as recited in item 8, and/or the anisotropic light-reflecting laminate as recited in item 9.

Advantages of the Invention

The anisotropic light-diffusing film and the anisotropic light-diffusing laminate of the invention are high in both of light transmittance and diffusivity; thus, when the film and laminate are each used as a diffusing film in a lighting equipment, a display, a light conducting plate of an advertising lamp, or the like, a high illuminance and brightness and an even illuminance and brightness can be obtained.

The anisotropic light-diffusing film and the anisotropic light-diffusing laminate of the invention have anisotropic light-diffusivity; thus, for example, when the anisotropic light-diffusing film is used in the state of being arranged to make a direction along which the extension of diffusion through the anisotropic light-diffusing film is large orthogonal to a direction along which the direction of the anisotropy based on the shape of a light source is cancelled, the above-mentioned advantageous effect can be exhibited at a higher level.

The anisotropic light-reflecting laminate of the invention is high in both of reflectivity and diffusivity when light is reflected thereon; thus, in indoor lighting, lighting in an internal-lighting type illumination panel, light radiation in a copying machine, lighting in a liquid crystal display device, or some other lighting that may be of various types, the light quantity of a light source therefor is effectively used, so that the illuminance or the brightness in the lighting can be made high.

Since the laminate is high in both of reflectivity and diffusivity, it can also be said that the laminate has an excellent reflective property having both of an intense reflectivity of a light reflector having metallic luster, and a mild reflection which is possessed by a white reflecting film. It is therefore possible to maintain high illuminance or brightness, and give such a mild illumination that glaringness is restrained, the illumination being desired in indoor lighting, lighting in an internal-lighting type illumination panel, or the like. That is, energy saving and the sufficiency of sensitive impression, which are desired in the present market, can be made compatible with each other.

The anisotropic light-reflecting laminate of the invention has the above-mentioned property in the reflection of light entering the laminate at a low angle. Thus, the laminate is suitable for, for example, a light reflector of a reflective liquid crystal display device.

About the anisotropic light-reflecting laminate of the invention, light reflected thereon has anisotropy, so that the laminate has a function of concentrating the reflected light into a specific direction. Thus, the laminate has a good characteristic that when the laminate is arranged to satisfy a positional relationship adapted for the shape of a light source, the reflectivity of the reflected light or the evenness of the reflectivity can be improved.

Accordingly, in indoor lighting, lighting in an internal-lighting type illumination panel, light radiation in a copying machine, lighting in a display device such as a liquid crystal display device, or some other lighting that may be of various types, the light quantity of its light source can be effectively reflected. Thus, in the above lighting, the illuminance or brightness can be made high.

In the laminate wherein a surface of a light reflector is covered with the anisotropic light-diffusing film of the invention, light reflected thereon has anisotropic diffusivity; thus, when the laminate is used in the state of being arranged to make the direction of the anisotropy of the anisotropic light-diffusing film consistent with a direction along which the direction of the anisotropy based on the shape of a light source is cancelled, the above effect can be exerted more highly.

Furthermore, the anisotropic light-diffusing film of the invention is produced by melt-extruding a mixture of two thermoplastic resins into a film form; thus, the economical efficiency is high. Moreover, fine particles as a non-melting light-diffusivity supplier used in known techniques are not blended therewith, so that the resultant film is high in clearness. When properties of the resins are optimized, the above-mentioned optical properties can be stably produced and further properties other than the optical properties, such as solvent-resistance, are also made very good. The economical efficiency is also high.

By specifying the blend composition of the thermoplastic resins in the invention, the external appearance of the anisotropic light-diffusing film can be improved.

BRIEF DESCRIPTIONS OF DRAWINGS

BEST MODE FOR CARRYING OUT THE INVENTION

The Anisotropic Light-Diffusing Film

Figure 1:
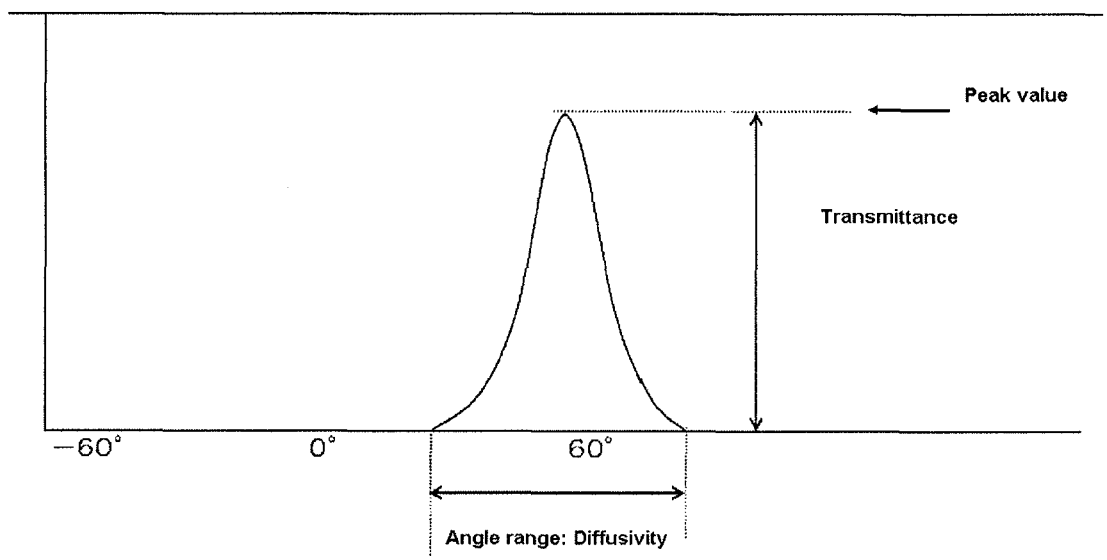
FIG. 1 is a chart showing a relationship between the transmittance and the diffusivity in a measuring curve of an automatic angle-variable photometer at an incidence angle of 60°.

The anisotropic light-diffusing film of the invention is a film which is obtained by melt-extruding a mixture containing at least two thermoplastic resins incompatible with each other, and has a structure containing a continuous phase and dispersed phases (sea-island structure), and/or a co-continuous-phase structure. It is preferred that at least one of the thermoplastic resins is a crystalline resin, and forms into a continuous phase or a co-continuous-phase.

The anisotropic light-diffusing film of the invention is preferably obtained by melt-extruding a mixture containing a thermoplastic resin (A) which forms into a continuous phase or a co-continuous-phase, and a thermoplastic resin (B) which forms into dispersed phases or the co-continuous-phase and is incompatible with the thermoplastic resin (A). Since the anisotropic light-diffusing film of the invention is produced by melt-extrusion, the film is high in economical efficiency. The thermoplastic resins are used in any of the continuous phase, the dispersed phases and the co-continuous-phase without blending the non-melting fine particles according to the known techniques as a light-diffusivity supplier; therefore, in the step of forming the film, the clogging of a filtration filter with the melted resins can be decreased. Thus, the productivity is excellent, and further the resultant film is also high in clearness. In many of the above-mentioned known techniques about an anisotropic light-diffusing film based on the melt-extrusion method, an amorphous resin is used as a continuous phase; thus, the resin has a problem of being low in solvent-resistance, and the like. In a preferred aspect of the invention, a crystalline resin is used in the continuous phase or the co-continuous-phase, whereby the problems can be solved.

In the invention, a melt-extrusion molding is used. The melt-extrusion molding is not particularly limited, and a process for forming a film may be, for example, anyone of T-die process and inflation process. The film may be a non-drawn film. In a preferred embodiment, the film is drawn at a temperature ranging from 80 to 160° C. in at least one direction during or after melt-extrusion molding. By the drawing operation, the heat resistance and optical properties of the resultant film can be improved.

The thickness of the anisotropic light-diffusing film of the invention is not particularly limited, and is preferably from 5 to 350 μm. The thickness is more preferably from 10 to 250 μm.

The anisotropic light-diffusing film of the invention may be a monolayer, or may have a multilayered constitution composed of two or more layers. In the case of the multilayered constitution, as far as at least one layer thereof is a layer having anisotropic light-diffusivity according to the above-mentioned constitution, the other layer(s) may (each) be a mere transparent layer having no anisotropic light-diffusivity, or an isotropic light-diffusing layer. All of the layers may be anisotropic light-diffusing layers. When the film contains a layer other than an anisotropic light-diffusing layer, it is preferred to make the anisotropic light-diffusing layer as an outermost layer. In the case of the multilayered constitution, the film may be produced by multilayer co-extruding process, or by extrusion laminating process or dry laminating process.

The thermoplastic resin (A) used in the invention, which forms into a continuous phase or co-continuous-phase, may be an amorphous resin such as a polystyrene resin, a polycarbonate resin or a polysulfone resin. The resin (A) is preferably a crystalline resin. Examples of the crystalline resin include a polyethylene resin, a polypropylene resin, a polyester resin, a polyamide resin, and a polyphenylenesulfide resin. Among them, it is preferred to use a polypropylene resin or a polyester resin since the resin is excellent in both of cost performance and mechanical property or heat resistance.

Examples of the polypropylene resin include a homo-polypropylene resin, and/or a copolymer wherein propylene is copolymerized with a different olefin monomer. It is preferred to use a homo-polypropylene resin, or a polypropylene resin wherein the content of the copolymerizable component is 5% or less by mass.

Examples of the polyester resin include polyethylene terephthalate, polypropylene terephthalate, polybutylene terephthalate, polyethylene naphthalate, polybutylene naphthalate and polycyclohexenedimethylene terephthalate; and copolymers and mixtures thereof.

The crystalline resin is preferably a resin having a melting heat of 20 J/g or more, the melting heat being according to a differential scanning calorimeter (DSC). The melting heat is more preferably 25 J/g or more. More specifically, in the case of a polypropylene resin, the melting heat is preferably 65 J/g or more. In the case of a polyester resin, more preferably, the melting heat is 20 J/g or more about a polyethylene terephthalate resin, is 30 J/g or more about a polypropylene terephthalate resin, is 32 J/g or more about a polybutylene terephthalate resin, and is 28 J/g or more about a polyethylene naphthalate resin. The upper limit thereof is the melting heat of homopolymer of each of these resins.

The thermoplastic resin (B) in the invention, which forms into dispersed phases or a co-continuous-phase, is not particularly limited as far as the resin is a thermoplastic resin incompatible with the thermoplastic resin (A), which forms into a continuous phase or the co-continuous-phase. The resin (B) is preferably a resin which has a melting point or softening point lower than the thermoplastic resin (A) and has a bending elastic modulus lower than the thermoplastic resin (A). More specifically, the resin (B) is more preferably a resin having a melting point or softening point of 50 to 160° C. and a bending elastic modulus of 50 to 1400 MPa. Among them, the resin (B) is preferably a polyolefin resin containing ethylene and/or butene.

Examples of the polyolefin resin containing ethylene and/or butene include a homo-polyethylene resin, a homo-butene resin, copolymers of these resins with a different olefin monomer, and copolymers of the resins with acrylic acid, methacrylic acid and any ester derivative thereof. In the case of the copolymers with a different olefin monomer, the copolymers may each be any one of random, block and graft copolymers.

The polyolefin resin may be a dispersion of EP rubber or the like. The process for producing the resin, the molecular weight thereof, and the like are not particularly limited, and are appropriately selected in accordance with characteristics required in the market.

The thermoplastic resin and the thermoplastic resin (B) are incompatible with each other. Thus, when the two are mixed with each other to be made into a film, any one of the resins is present as dispersed phases or the two are present as a co-continuous-phase. Accordingly, light is refracted or scattered on interfaces of the dispersed phases or the co-continuous-phase. Thus, when light is transmitted through the resultant film, the transmitted light is diffused.

In the invention, the structure, the shape and the size of the dispersed phases or the co-continuous-phase are not limited. The two structures may be mixed with each other.

The shapes are not limited, either. It is preferred that the shapes include a shape oriented into a specified direction in order to give anisotropy to light diffusion.

The size or the size distribution of the dispersed phases or the co-continuous-phase is appropriately selected in accordance with characteristics required for the resultant polyolefin light-diffusing film in the market.

In a preferred aspect of the invention, a nanocrystal-structure-controlled polyolefin elastomer resin (C), besides the thermoplastic resins (A) and (B), is incorporated. The incorporation of the nanocrystal-structure-controlled polyolefin elastomer resin (C) makes a remarkable improvement in the external appearance of the resultant polyolefin light-diffusing film. In the case of using the blend of the two of the thermoplastic resins (A) and (B) without incorporating the elastomer resin (C), a fine wavelet-form external appearance giving an unevenness feeling may be generated in the surface of the resultant polyolefin light-diffusing film. However, the incorporation of the elastomer resin (C) makes it possible to restrain the generation of such inferiority of the external appearance. Thus, an anisotropic diffusing film good in external appearance can be stably obtained.

By the incorporation of the elastomer resin (C), the light diffusivity, the light transmission and other optical properties are also varied. Thus, this case also produces an advantage that a range in which the optical properties are controllable can be made wider than the case of using the blend of the two of the thermoplastic resins (A) and (B).

In the invention, the nanocrystal-structure-controlled polyolefin elastomer resin (C) is a thermoplastic polyolefin elastomer wherein the crystal/amorphous structure of the polymer is controlled in a nano-order and the crystal has a nano-order network structure. An example thereof includes an elastomer manufactured by Mitsui Chemicals, Inc., NOTIO (registered trade name). The brand thereof is not limited, and is appropriately selected in accordance with characteristics required for the resultant polyolefin light-diffusing film in the market.

While the crystal size of conventional polyolefin elastomer resins is in a micron-order, the crystal size of the nanocrystal-structure-controlled polyolefin elastomer resin (C) in the invention is controlled in a nano-order. In many cases, therefore, this resin is better in transparency, heat resistance, flexibility, rubber elasticity, and the like than the conventional polyolefin elastomer resins.

Hereinafter, the nanocrystal-structure-controlled polyolefin elastomer resin (C) may be referred to as an elastomer resin (C).

By the constitution of the thermoplastic resins as described above, the optical properties of the invention are stably obtained, and a variation thereof can be restrained. On the other hand, if the softening point and bending elastic modulus are outside the above-mentioned range of the softening point and bending elastic modulus, for example, optical properties which are to be described later may be largely varied by the thermal set temperature in the process for forming the film, and the like. Thus, a film having a stable quality may not be obtained. The reason therefor is unclear; however, it is presumed that when the above-mentioned ranges of the softening point and the bending elastic modulus are satisfied, a change in the shape of the thermoplastic resin (B) due to the orientation or the thermal set temperature in the film-forming process is made stable. On the other hand, if the softening point and the bending elastic modulus are outside the above-mentioned ranges, a change in the shape of the thermoplastic resin (B) due to the drawing or the thermal set temperature becomes large. That is, when the softening point and the like satisfy the above-mentioned ranges, the elastic modulus of the thermoplastic resin (B) is very low in the above-mentioned process, and thus even when the temperature in the process is varied, a change in the shape thereof is small; however, if the softening point and the like exceed the upper limits of the above-mentioned ranges, a change in the elastic modulus of the thermoplastic resin (B) is made large by a change in the temperature in the process, and thus the degree of a change in the shape of the thermoplastic resin (B) is varied so that a variation in the optical properties, which are to be described later, is caused.

The blend ratio of the thermoplastic resin (A), which forms into a continuous phase or a co-continuous-phase, to the resin (B), which forms into dispersed phases or the co-continuous-phase, is not particularly limited. The blend ratio of the thermoplastic resin (A) to the thermoplastic resin (B) is appropriately selected from, for example, the range of 10/90 to 90/10 (ratio by mass). The blend ratio thereof is more preferably from 20/80 to 80/20 (ratio by mass). If the blend ratio is outside the above-mentioned range, the diffusivity of light unfavorably falls.

The amount of the thermoplastic resin (A) is preferably 50 parts by mass or more, more preferably 55 parts by mass or more for 100 parts by mass of all the resins.

The blend amount of the elastomer resin (C) is preferably from 2 to 50 parts by mass, more preferably from 5 to 40 parts by mass for 100 parts by mass of the total amount of the thermoplastic resins (A) and (B). If the blend amount is less than 2 parts by mass, the effect of improving the external appearance or optical properties of the resultant polyolefin light-diffusing film unfavorably declines. Conversely, if the amount is more than 50 parts by mass, the effect of improving the external appearance or optical properties of the resultant polyolefin light-diffusing film is saturated and further the rigidity of the resultant polyolefin light-diffusing film unfavorably lowers. Additionally, an economical disadvantage is caused.

About the mixing of the thermoplastic resins and the elastomer resin, it is allowable to mix the resins with each other when the film is formed, so as to be supplied. It is also allowable to use a blend composition wherein two or three of the resins are beforehand melted and kneaded by means of a separate extruder.

In the invention, an additive may be used together, examples thereof including a compatibility accelerator for improving the compatibility between the thermoplastic resins (B) and (A), and a dispersion particle diameter adjustor. However, it is advisable to avoid the blend of a compound reactive with the thermoplastic resin (A) or (B), such as an epoxy group, since the compound causes the resin to be crosslinked so that the clearness of the resultant film declines.

It is allowable to incorporate, into resins constituting the thermoplastic resins (A) and (B), a stabilizer such as an antioxidant or ultraviolet absorbent, an antistatic agent, or the like. Fine particles such as inorganic particles or polymer beads may be added thereto as far as the above-mentioned properties are not damaged.

In the invention, the thermoplastic resin (A), which forms into a continuous phase or a co-continuous-phase, and the resin (B), which forms into dispersed phases or the co-continuous-phase, may be exchanged with each other.

From the viewpoint of heat resistance and the like, however, the embodiment described till now is preferable.

In the anisotropic light-diffusing film prepared by the above-mentioned process in the invention, it is preferred that no voids are present at interfaces between the thermoplastic resins (A) and (B) in the light-diffusing layer. If voids are present at the interfaces, refraction or reflection in/on the interfaces may cause an inconvenience for the expression of the diffusivity and the reflectivity of the invention.

As to an anisotropic light-diffusing film of the invention, it is important that the parallel light ray transmittance of the film is from 20 to 85%, the haze of the film is from 10 to 80%, the glossiness of the film is from 10 to 70%, and further the transmitted light diffusivity ratio (DTv/DTh) of the film is from 1.3 to 6.0, the ratio (DTv/DTh) being the ratio of the diffusivity of transmitted light (DTv) which is measured with an angle-variable photometer when the incidence angle is set to 60 degrees in the state where a sample is fixed to set the orientation direction of the dispersed phases or the co-continuous-phase of the film to the vertical direction to the diffusivity of transmitted light (DTh) measured in the above-mentioned same manner in the state where the sample is fixed to set the orientation direction of the dispersed phases or the co-continuous-phase of the film to the horizontal lateral direction.

The parallel light ray transmittance of the anisotropic light-diffusing film of the invention is more preferably from 25 to 82%. If the parallel light ray transmittance is less than 20%, the light transmittance unfavorably declines. Conversely, if the transmittance is more than 85%, the diffusivity of the transmitted light unfavorably declines.

The haze of the anisotropic light-diffusing film of the invention is more preferably from 15 to 75%. If the haze is less than 10%, the diffusivity of the transmitted light unfavorably declines. Conversely, if the haze is more than 80%, the light transmittance unfavorably declines.

When the above-mentioned properties are satisfied, the transmittance and the diffusivity of the transmitted light, which are to be described later, are set in preferred ranges. The reason therefor is unclear; however, it is presumed that the parallel light ray transmittance and the haze contribute to the reflectivity and the diffusivity, respectively, so that when the two properties are made optimal, the light transmittance and, the diffusivity of the transmitted light are set in preferred ranges. That is, it is presumed that the transmittance is largely affected by the transmitted light that has been transmitted in parallel. For example, total light ray transmittance, which is disclosed in the prior art, is the transmittance of light rays including scattered light; thus, this transmittance is effective as a scale of the diffusivity of transmitted light. However, for the invention, which aims for compatibility between the light transmittance, and the diffusivity of the transmitted light, it may not be easily said that the total light ray transmittance is an effective property. Actually, it is preferred for the invention that the total light ray transmittance is restricted into a narrow range of 85 to 97%. The total light ray transmittance is more preferably from 87 to 95%. If the total light ray transmittance is less than 85%, the light transmittance unfavorably lowers. Conversely, if it is more than 97%, the diffusivity of the transmitted light unfavorably lowers.

The glossiness of the anisotropic light-diffusing film of the invention is more preferably from 15 to 65%. If the glossiness is less than 10%, the transmittance unfavorably lowers. Conversely, if it is more than 70%, the diffusivity of the transmitted light unfavorably lowers.

In the invention, methods for measuring the above-mentioned optical properties are to be described in detail in working examples; however, measured values are used which are obtained by the measurement in the state where any sample to be measured is fixed in the following direction since the dispersed phases or the co-continuous-phase of the anisotropic light-diffusing film of the invention is/are oriented in a specific direction: that is, in the case of measuring the total light ray transmittance, the parallel light ray transmittance and the haze, measured values are used which are obtained in the state where the sample is fixed in a fixing section to make the orientation direction parallel to the vertical direction; in the case of measuring the glossiness, a measured value is used which is obtained by the measurement in the state where the sample is fixed to make the orientation direction parallel to the front and back direction of a device for the measurement. About any isotropic sample, which has no anisotropy, optical properties thereof are measured in the state where the sample is fixed on the supposition that the length direction of the film or sheet corresponds to the orientation of the anisotropic sample.

It is important that the anisotropic light-diffusing film of the invention satisfies not only the above-mentioned properties but also the following: the transmitted light diffusivity ratio (DTv/DTh) of the film is from 1.3 to 6.0, the ratio being the ratio of the diffusivity (DTv) of transmitted light which is measured with an angle-variable photometer when the incidence angle is set to 60 degrees in the state where a sample is fixed to set the orientation direction of the dispersed phases or the co-continuous-phase of the film to the vertical direction to the diffusivity (DTh) of transmitted light measured in the above-mentioned same manner in the state where the sample is fixed to set the orientation direction of the dispersed phases or the co-continuous-phase of the film to the horizontal direction. DTv and DTh are measured by a method described in Examples. Hereinafter, the transmitted light diffusivity ratio may be referred to merely as a diffusivity ratio. The diffusivity ratio is a scale of the anisotropy of the transmitted light. The anisotropy is larger as the numerical value thereof is larger. It is presumed that when the anisotropy is imparted, the transmitted light is condensed in a specific direction so that the light condensing effect makes the transmittance high in the specific direction.

The diffusivity ratio of the anisotropic light-diffusing film of the invention is more preferably from 1.4 to 6, more preferably from 1.5 to 6. If the diffusivity ratio is less than 1.3, the effect based on the imparting of the anisotropy declines. On the other hand, as the upper limit thereof is higher, a more preferable result is obtained. In the invention, however, the upper limit which can be attained by any economical method is about 6.

The orientation direction of the dispersed phases or the co-continuous-phase can be confirmed by, for example, observation with a confocal laser microscope or the like.

Hereinafter, the above-mentioned diffusivity (DTv) may be referred to as the main diffusivity. The direction along which the main diffusivity is shown may be referred to as the main diffusion direction.

The method for satisfying the above-mentioned diffusivity ratio is not particularly limited, and is preferably a method of heightening the orientation of the dispersed phases in the continuous phase, or the orientation of the co-continuous-phase, thereby attaining the ratio. The direction orthogonal to the orientation direction of the dispersed phases or the co-continuous-phase is the main diffusion direction. In general, the diffusivity ratio is higher as the orientation degree of the dispersed phases or the co-continuous-phase is higher.

The method for heightening the orientation degree of the dispersed phases or the co-continuous-phase is not particularly limited, and an example thereof includes optimization of the composition of the thermoplastic resins (A) and (B), the blend amount of the elastomer resin (C), the flow characteristics of these resins, the draft ratio when the resins are extruded to be formed into a film, conditions for drawing the film, and the like. For example, in the case of the resin composition, it is preferred to use, as the thermoplastic resin (B), a resin softer than the thermoplastic resin (A). It is also preferred to make the draft ratio at the time of the film extruding-formation high. It is also preferred in the drawing to make the ratio in one of the directions high. In order to make the orientation degree of the dispersed phases or the co-continuous-phase high, monoaxial drawing is most preferred. It is however advisable to set the kind of the drawing appropriately in accordance with a requirement in the market, or the balance between the degree and other physical properties.

The diffusivity in the main diffusion direction of the anisotropic light-diffusing film of the invention is preferably 50 degrees or more, more preferably 55 degrees or more. On the other hand, about the upper limit thereof, abetter result is obtained as the upper limit thereof is higher. In the invention, however, the upper limit which can be attained by any economical method is about 120 degrees.

If the diffusivity is less than 50 degrees, the diffusivity when the film is used as a light-diffusing film is low. Thus, the evenness of the illuminance or brightness declines so that a tube shade of a light source or a spot unfavorably comes to be viewed.

The transmittance (T%v) of the anisotropic light-diffusing film of the invention in the main diffusion direction is preferably 5% or more, more preferably 8% or more, even more preferably 10% or more. On the other hand, about the upper limit thereof, a better result is obtained as the upper limit thereof is higher. In the invention, however, the upper limit which can be attained by any economical method is about 90%. If the light transmittance is less than 5%, the illuminance or brightness is unfavorably low when the film is used as a light-diffusing film.

The above-mentioned transmittance (T%v) is a value which represents, in the unit of %, the ratio of a peak top in the following chart to the full scale of the chart: an angle-variable photometer measurement chart in the main diffusion direction obtained by a diffusivity-ratio-measuring method described in examples (see FIG. 1).

In the anisotropic light-diffusing film of the invention, the following expression (1) or (2) is more preferably satisfied by DTv described above and the transmittance (T%v) measured in the state where a sample is fixed to set the orientation direction of the dispersed phases or the co-continuous-phase of the film to the vertical direction:

$$60 < DTv \leq 120, 10 \leq T\%v \leq 90 \quad (1)$$

$$35 \leq DTv \leq 60, -3.2 \times DTv + 203 \leq T\%v \leq 90 \quad (2)$$

Figure 2:
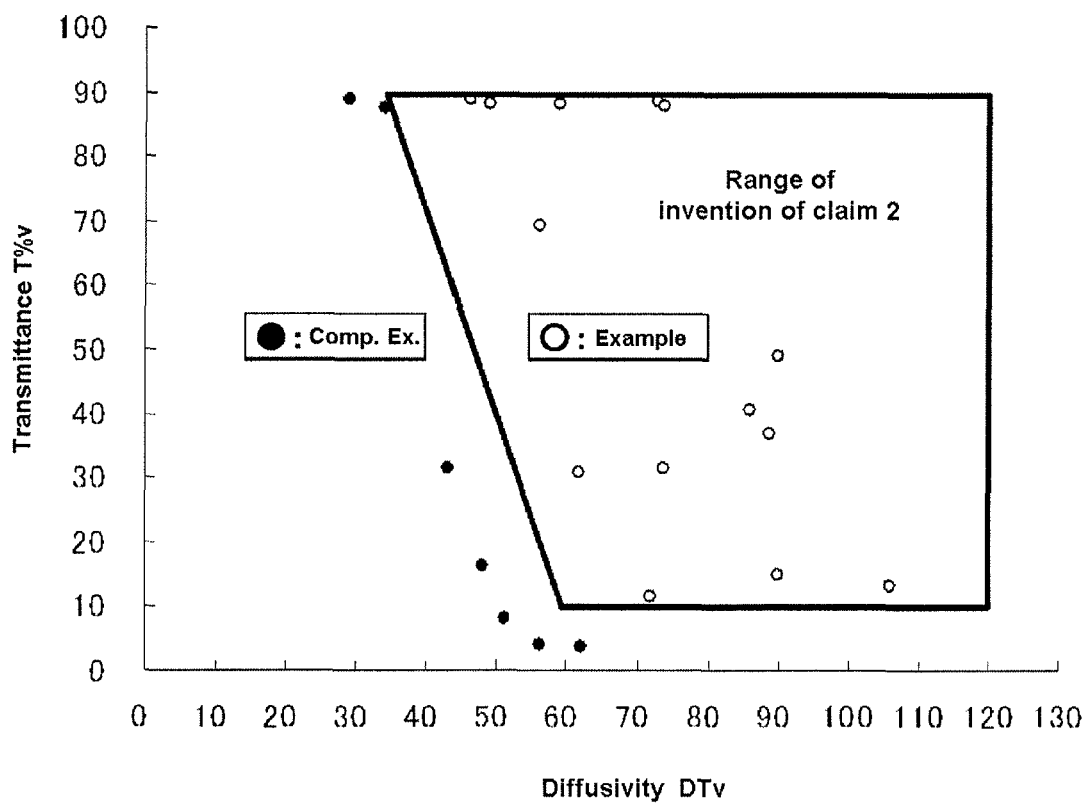
FIG. 2 is a chart showing a relationship between the transmittances of anisotropic light-diffusing films and laminates, and the diffusivities thereof.

This preferred range is a range shown in FIG. 2. When the range is satisfied, both properties of the transmittance and the diffusivity of light can be more effectively expressed.

(An Anisotropic Light-Diffusing Laminate)

Another aspect of the invention is an anisotropic light-diffusing laminate comprising an anisotropic light-diffusing film obtained by the above-mentioned method, and a plastic sheet which is laminated over the film and has a thickness of 0.1 to 5 mm and a total light ray transmittance of 80 to 100%.

The anisotropic light-diffusing film obtained by the above-mentioned method has excellent optical properties as described above. However, for some purpose, the film may be unable to satisfy properties other than optical properties, such as heat resistance, dimension stability against heat, rigidity and other mechanical properties, flame retardancy, or the like. When a transparent plastic sheet is laminated onto the anisotropic light-diffusing film of the invention, properties other than optical properties are complemented so that overall properties required in the market can be satisfied.

The transparent plastic sheet used in the invention is not limited about the kind of the resin, the layer constitution thereof, and the like as far as the sheet satisfies the above-mentioned characteristics about the thickness and the total light ray transmittance thereof.

The thickness of the transparent plastic sheet used in the invention is more preferably from 0.5 to 3 mm. If the thickness is less than 0.1 mm, the reinforcing or complementing effect is insufficient. If the thickness is more than 5 mm, an economical disadvantage may be caused or the flexibility may be damaged.

The total light ray transmittance of the transparent plastic sheet used in the invention is more preferably from 85 to 100%, even more preferably from 90 to 100%. If the transmittance is less than 80%, the above-mentioned properties of the anisotropic light-diffusing film cannot be effectively used. The sheet is preferably a non-diffusive sheet having high total light ray transmittance as much as possible. Preferred is also a method of using, as the plastic sheet, a diffusive sheet to cause a multiple effect to be expressed.

The resin used for the plastic sheet is preferably a resin used for optics, examples thereof including a polyester resin, an acrylic resin, a styrene resin, and a polycarbonate resin. However, the resin is not particularly limited.

The method for preparing the anisotropic light-diffusing laminate is not particularly limited. The method may be a method of bonding the anisotropic light-diffusing film and the plastic sheet onto each other.

A description is made about an example of the case of the method of attaining the bonding with a pressure sensitive adhesive agent or adhesive agent. Specific examples of the pressure sensitive adhesive agent include rubbery pressure sensitive adhesive agents, acrylic pressure sensitive adhesive agents, silicone pressure sensitive adhesive agents, and vinyl-containing pressure sensitive adhesive agents. Since the light reflector of the invention may be used at high temperature, the pressure sensitive adhesive agent is preferably a pressure sensitive adhesive agent stable even at a temperature from normal temperature to 120° C. The acrylic pressure sensitive adhesive agents, among the above-mentioned pressure sensitive adhesive agents, are widely used since the agents are inexpensive. When any pressure sensitive adhesive agent is used, the thickness thereof is preferably from 0.5 to 50 μm.

The adhesive agent is an adhesive agent for sticking by aid of heat or a catalyst, and may be an ordinary adhesive agent such as a silicone, polyurethane, polyester, epoxy, cyanoacrylate, or acrylic adhesive agent. Since the laminate of the invention may be used at high temperature, the adhesive agent is preferably an adhesive agent stable even at a temperature of normal temperature to 120° C. The epoxy adhesive agent, among the above-mentioned adhesive agents, is preferably used since the agent is excellent in strength and heat resistance. The cyanoacrylate adhesive agent can be used in an efficient production of the laminate since the agent is excellent in immediate effectivity and strength. The polyester adhesive agent is particularly suitable for the production of the laminate since the agent is excellent in strength and processability. These adhesive agents are roughly classified into a thermosetting type, a hot melt type and two-liquid-mixing type in accordance with the sticking manner thereof. Preferably, use is made of the thermosetting type or hot melt type, which makes it possible to attain a continuous production. When any adhesive agent is used, the thickness thereof is preferably from 0.5 to 50 μm.

The method for bonding the plastic sheet and the anisotropic light-diffusing film onto each other through the adhesive agent or pressure sensitive adhesive agent interposed therebetween may be a method of bonding them onto each other through a roll-to-roll process or a roll-to-sheet process using a laminator. In this way, a product in the form of a roll or a single sheet is yielded.

In the case of using, for example, the adhesive agent, any one of the plastic sheet and the anisotropic light-diffusing film is coated with the adhesive agent, and the resultant is dried and then laminated onto the partner matter by laminating using a roller.

The method for the coating with the adhesive agent is classified into various manners in accordance with the kind of the substrate, or the adhesive agent. Widely used manners are a gravure coater manner, a comma coater manner, and a reverse coater manner. In the gravure coater manner, the coating is attained by rotating a gravure roll which is partially immersed in the adhesive agent, and bringing a film fed through backup rollers into contact with a gravure roll onto which the adhesive agent adheres. The coating amount can be adjusted by controlling the rotation number of the roll, or the viscosity of the adhesive agent. The reverse coater manner is similar to the gravure coater manner. However, the amount of the adhesive agent which is to adhere onto a coating roll is adjusted through a metaling roll set to contact the coating roll.

When the film and the sheet are bonded to each other, they may be heated if necessary. In order to obtain a necessary sticking strength, they may be thermally treated after the laminating.

When they are bonded to each other through the pressure sensitive adhesive agent, a double-sided pressure sensitive adhesive sheet may be used. In the case of this method, it is preferred to use a highly-transparent-type pressure sensitive adhesive agent for optics. However, the pressure sensitive adhesive agent to be used is not particularly limited. For example, a pressure sensitive adhesive sheet having light diffusivity or anisotropy may be used. In the case of this pressure sensitive adhesive sheet, light diffusivity or anisotropy may be given to its adhesive layer.

(A Lighting Equipment and a Display Device)

A still another aspect of the invention is a lighting equipment, comprising the above-mentioned anisotropic light-diffusing film, or anisotropic light-diffusing laminate as a light-diffusing film.

Also, a still another aspect of the invention is a display device, comprising the above-mentioned anisotropic light-diffusing film as a light-diffusing film.

About lighting equipments or display devices, a light-diffusing film is widely used to make the evenness of light from their light source high. As described above, light-diffusing films known in the prior art have a problem against compatibility between the transmittance and diffusivity of light. Moreover, their function of canceling the anisotropy of the light source may be unable to satisfy requirements in the market, either. Furthermore, there also remains a problem about economical efficiency or properties other than optical properties.

In the anisotropic light-diffusing film of the invention, these problems are solved, and the film can be used suitably as a light-diffusing film of a lighting equipment or display device.

Since the anisotropic light-diffusing film of the invention has anisotropy in the light diffusivity thereof, the above-mentioned advantageous effects can be exhibited into a higher degree by use of the film, in particular, in the state where the film is set to make the direction of the anisotropy of the anisotropic light-diffusing film consistent with a direction along which the direction of the anisotropy based on the shape of a light source is cancelled. In the case of, for example, a fluorescent lamp, it is preferred to use the anisotropic light-diffusing film in the state where the film is set to make the main diffusion direction thereof parallel to the length direction of the fluorescent lamp.

On the other hand, an LED light source is in a spot form. Accordingly, it is advisable to set the direction in which the anisotropic light-diffusing film is placed in accordance with a desired diffusion direction. For example, plural LED light sources are arranged in series; thus, it is preferred to use the anisotropic light-diffusing film in the state where the film is set to make the main diffusion direction of the film orthogonal to the serial direction. When isotropic diffusion is requested, it is preferred to set up two anisotropic light-diffusing films in the form of being put onto each other to make the individual main diffusion directions thereof orthogonal to each other, thereby diffusing light into the two directions to improve the evenness thereof.

The lighting equipment in the invention is not limited only to any lighting equipment used for lighting in a living room such as the inside of a room or car. The invention is applied to any lighting equipment having a function of the so-called optical illumination, such as a lighting equipment used for radiation in an inspector or a copying machine, for illumination, or the like.

The display tool in the invention is not limited only to any flat panel type display device, a typical example of which is an LCD display device. The invention is applied to any display device using a function of optical illumination, such as an internal-lighting type illumination panel.

In this using manner, any of the anisotropic light-diffusing film or anisotropic light-diffusing laminate may be used. Plural films or plural laminates may be used in the state of being put onto each other. In this using manner, they may be used only in the state of being put onto each other, or may be used in the state of being bonded to each other. Furthermore, a light-diffusing film yielded by a method other than the invention may be used.

This manner is a recommendable manner for the following reason: in a case where the plural films or laminates are used as, for example, a diffusing film of a display, the brightness may become far better than in the case of using the single film or laminate. It is particularly recommendable to put the film or laminate onto an isotropic light-diffusing film which is based on a bead-coating process and has a high diffusivity.

Figure 5:
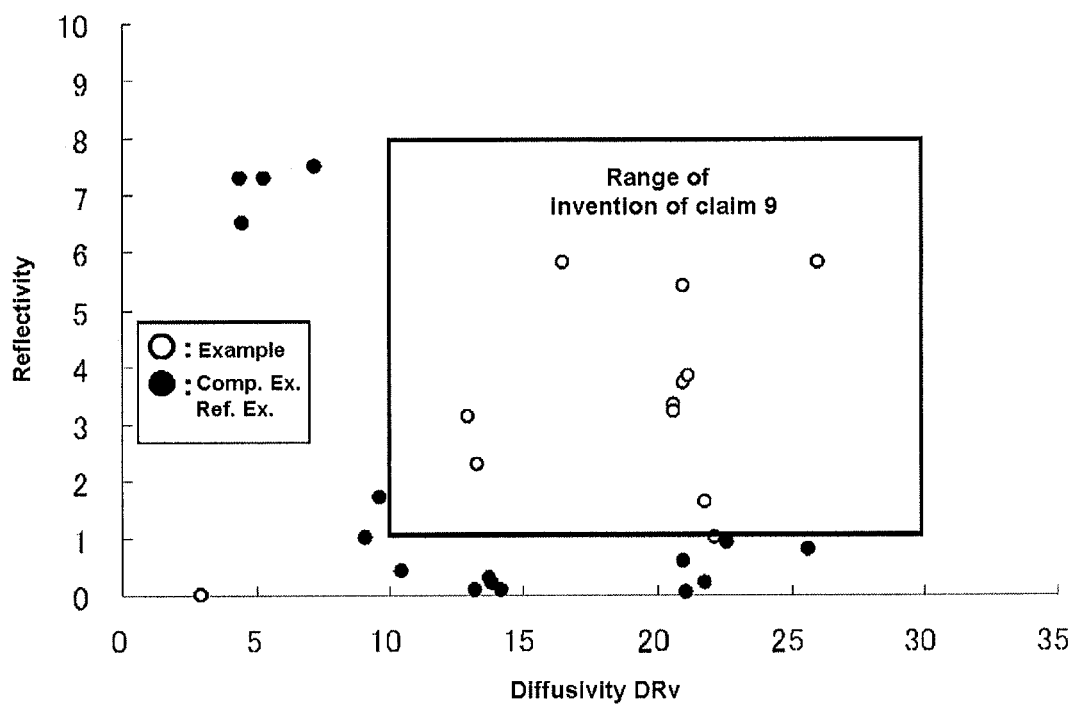
FIG. 5 is a chart showing a relationship between the reflectivity of an anisotropic light-reflecting laminate and the diffusivity thereof.

An additional aspect of the invention is an anisotropic light-reflecting laminate comprising: a light reflector containing a metallic layer; and an anisotropic light-diffusing layer which is obtained by melt-extruding a mixture containing at least two thermoplastic resins incompatible with each other and comprises a structure containing a continuous phase and dispersed phases, and/or a co-continuous-phase structure, this anisotropic light-diffusing layer being laminated over at least one surface of the light reflector; wherein the reflected light diffusiveity ratio of the laminate is from 1.3 to 10, the ratio (DRv/DRh) being the ratio of the diffusivity of reflected light (DRv) which is measured with an angle-variable photometer when the incidence angle is set to 15 degrees in the state where a sample is fixed to set the orientation direction of the dispersed phases or the co-continuous-phase of the film to the vertical direction to the diffusivity of reflected light (DRh) measured in the above-mentioned same manner in the state where the sample is fixed to set the orientation direction of the dispersed phases or the co-continuous-phase of the film to the horizontal lateral direction; and the reflectivity and the diffusivity of the diffusing film side of the laminate are from 0.5 to 8 and from 10 to 30, respectively. The anisotropic light-reflecting laminate is preferably obtained by covering a surface of a light reflector containing a metallic layer with the above-mentioned anisotropic light-diffusing film (see FIG. 5).

(The Light Reflector Containing a Metallic Layer Used for the Anisotropic Light-Reflecting Laminate)

The light reflector containing a metallic layer used in the invention is not particularly limited about the material, the form and the constitution thereof, and the like as far as the reflector contains a metallic layer having a light reflecting function. The reflector may be, for example, a metallic plate or a metallic foil piece, or may be a laminate composed of a plastic film or plastic sheet, which may be referred to merely as a substrate film hereinafter, and a metal. A metallic layer may be formed directly on a single surface of the anisotropic light-diffusing layer, which is to be described later.

In the case of the metallic plate or metallic foil piece, examples thereof include various metals such as iron, various stainless steels, copper, copper alloys, aluminum, aluminum alloys, tin alloys, steel plates, nickel, and zinc. The thickness of the metallic plate or metallic foil piece is from 0.05 to 0.8 mm, which is a rough target thickness. However, the thickness is not limited to such a thickness, and may be appropriately selected in accordance with the using manner.

A surface of the metallic plate or metallic foil piece may be subjected to monolayered plating, multilayered plating, or alloy plating, or to immersing treatment in chromic acid, or phosphoric acid chromic acid treatment. In order to improve the adhesiveness onto the anisotropic light-diffusing layer, which is to be described later, the surface may be subjected to surface treatment that may be of various types, examples thereof including chemical treatments, such as treatment with a coupling agent such as a silane coupling agent or a titanium coupling agent, acid treatment, alkali treatment, ozone treatment, and ion treatment; plasma treatment; discharge treatments such as glow discharge treatment, arc discharge treatment and corona discharge treatment; electromagnetic wave treatments such as ultraviolet treatment, X-ray treatment, gamma ray treatment and laser treatment; flame treatment; and primer treatment.

The metal is preferably aluminum, copper or any alloy thereof. Since these metals are high in thermal conductivity, heat generated locally from a light source is favorably diffused to the whole of the substrate so as to dissipate the heat.

In the case of using, as the light reflector, a laminate composed of a substrate film and a metal, the substrate film may be a substrate made of a homopolymer such as polypropylene, polyethylene terephthalate, polyethylene naphthalate, polybutylene terephthalate, an acrylic resin, a methacrylic resin, polycarbonate, polyethersulfone, polyetheretherketone, polyallylate, polyetherimide or polyimide, a copolymer, or the like. The thickness of the substrate film is preferably from 5 to 2000 μm, more preferably from 10 to 1500 μm, considering the handleability and the shape-retaining property.

The material or the thickness of the substrate film is appropriately selected in accordance with the using manner of the light reflector, or properties required for the using manner.

In the case of using, as the light reflector, a laminate composed of a substrate film and a metal, a layer of the metal may be above-mentioned metallic plate or foil piece. Preferably, a thin-film metallic layer yielded by vapor deposition or the like is used. The kind of the metal which forms the metallic thin-film layer is not particularly limited as far as the metal has metallic luster. It is preferred to use a thin-film layer of silver or aluminum, or an alloy containing such a metal as a main component. As far as the objects of the invention are not damaged, it is allowable to incorporate, into this metallic thin-film layer, a very small amount of a compound of a different metal, or to laminate this metallic thin-film layer onto one or more different metallic thin-film layers or one or more metal oxide layers to form two or more layers. It is also allowable to form, as an outermost layer of the metallic thin-film layer, an anticorrosive metallic thin-film layer made of Ti, Ni, Cr, or a metal oxide thereof, or the like.

The metallic thin-film layer is formed on one or both surfaces of the substrate film. In this case, it is preferred that when the substrate film is viewed from the surface side of the substrate film, the metallic thin-film layer can be viewed. For example, even when a metallic thin-film layer is formed on one of the surfaces to give an area ratio of 50% and another metallic thin-film layer is formed on the other surface to give an area ratio of 80%, this thin-film-laminate is allowable for the invention as far as this laminate is a laminate about which when viewed from any one of the surface sides, one of the metallic thin-film layers is viewable.

As the method for forming the metallic thin-film layer(s) on the substrate film, a known method may be used without any limitation, examples of the method including plating, vacuum vapor-deposition, sputtering, ion plating, ionizing vapor deposition, and ion cluster beam vapor deposition methods.

The thickness of the metallic thin-film layer(s) is preferably from 10 to 500 nm. The thickness is more preferably from 50 to 200 nm, even more preferably from 80 to 150 nm from the viewpoint of cost performance.

When the metallic thin-film layer(s) is/are formed on the surface(s) of the substrate film, it is preferred to subject the polymeric film surface(s) to corona discharge treatment, glow discharge treatment, chemical surface treatment, surface-roughening treatment, or the like to improve the adhesiveness between the two.

(The Anisotropic Light-Reflecting Laminate)

The anisotropic light-reflecting laminate of the invention is yielded, for example, by laminating the above-mentioned anisotropic light-diffusing film and the above-mentioned light reflector containing a metallic layer onto each other. A metallic layer may be formed directly onto a single surface of the anisotropic light-diffusing film.

In the case of the method of forming a metallic layer directly onto a single surface of the anisotropic light-diffusing film, a method equivalent to the above-mentioned method of forming a metallic thin-film layer onto a substrate film is suitable.

The method for laminating the anisotropic light-diffusing film and the light reflector containing a metallic layer onto each other is not particularly limited. Examples thereof include a method of bonding the anisotropic light-diffusing film onto a metallic plate, a metallic foil piece, or a laminate composed of a substrate film and a metal through an adhesive agent or pressure sensitive adhesive agent; and a method of attaining the laminating through an extrusion laminating process of extruding the anisotropic light-diffusing film onto a surface of a metallic plate, a metallic foil piece, or a laminate composed of a substrate film and a metal. It is allowable to use the anisotropic light-diffusing film, and a metallic plate, a metallic foil piece, or a laminate composed of a substrate film and a metal merely in the state where the film and the latter are put onto each other. When the light reflector and the film are bonded onto each other through the adhesive agent or pressure sensitive adhesive agent, the kind of the adhesive agent or pressure sensitive adhesive agent is not particularly limited. Preferably, use is made of a brand for optics, which is excellent in transparency.

A description is made about an example of the case of the method of bonding the anisotropic light-diffusing film onto a metallic plate, a metallic foil piece, or a laminate composed of a substrate film and a metal through an adhesive agent or pressure sensitive adhesive agent.

Specific examples of the pressure sensitive adhesive agent include rubbery pressure sensitive adhesive agents, acrylic pressure sensitive adhesive agents, silicone pressure sensitive adhesive agents, and vinyl-containing pressure sensitive adhesive agents. Since the light reflector of the invention may be used at high temperature, the pressure sensitive adhesive agent is preferably a pressure sensitive adhesive agent stable even at a temperature from normal temperature to 120° C. The acrylic pressure sensitive adhesive agents, among the above-mentioned pressure sensitive adhesive agents, are widely used since the agents are inexpensive. When any pressure sensitive adhesive agent is used, the thickness thereof is preferably from 0.5 to 50 μm.

The adhesive agent is an adhesive agent for sticking by aid of heat or a catalyst, and may be an ordinary adhesive agent such as a silicone, polyurethane, polyester, epoxy, cyanoacrylate, or acrylic adhesive agent. Since the laminate of the invention may be used at high temperature, the adhesive agent is preferably an adhesive agent stable even at a temperature of normal temperature to 120° C. The epoxy adhesive agent, among the above-mentioned adhesive agents, is preferably used since the agent is excellent in strength and heat resistance. The cyanoacrylate adhesive agent can be used in an efficient production of the laminate since the agent is excellent in immediate effectivity and strength. The polyester adhesive agent is particularly suitable for the production of the laminate since the agent is excellent in strength and processability. These adhesive agents are roughly classified into a thermosetting type, a hot melt type and two-liquid-mixing type in accordance with the sticking manner thereof. Preferably, use is made of the thermosetting type or hot melt type, which makes it possible to attain a continuous production. When any adhesive agent is used, the thickness thereof is preferably from 0.5 to 50 p.m.

The method for bonding the light reflector and the anisotropic light-diffusing film onto each other through the adhesive agent or pressure sensitive adhesive agent interposed therebetween may be a method of bonding them onto each other through a roll-to-roll process or a roll-to-sheet process using a laminator. In this way, a product in the form of a roll or a single sheet is yielded.

In the case of using, for example, the adhesive agent, any one of the light reflector and the anisotropic light-diffusing film is coated with the adhesive agent, and the resultant is dried and then laminated onto the partner matter by laminating using a roller.

The method for the coating with the adhesive agent is classified into various manners in accordance with the kind of the substrate, or the adhesive agent. Widely used manners are a gravure coater manner, a comma coater manner, and a reverse coater manner. In the gravure coater manner, the coating is attained by rotating a gravure roll which is partially immersed in the adhesive agent, and bringing a film fed through backup rollers into contact with a gravure roll onto which the adhesive agent adheres. The coating amount can be adjusted by controlling the rotation number of the roll, or the viscosity of the adhesive agent. The reverse coater manner is similar to the gravure coater manner. However, the amount of the adhesive agent which is to adhere onto a coating roll is adjusted through a metaling roll set to contact the coating roll.

When the film and the sheet are bonded to each other, they may be heated if necessary. In order to obtain a necessary sticking strength, they may be thermally treated after the laminating.

When they are bonded to each other through the pressure sensitive adhesive agent, a double-sided pressure sensitive adhesive sheet may be used. In the case of this method, it is preferred to use a highly-transparent-type pressure sensitive adhesive agent for optics. However, the pressure sensitive adhesive agent to be used is not limited only to it. For example, a pressure sensitive adhesive sheet having light diffusivity or anisotropy may be used. In the case of this pressure sensitive adhesive sheet, light diffusivity or anisotropy may be given to its adhesive layer.

It is important that the anisotropic light-reflecting laminate of the invention satisfies the following: the reflected light diffusivity ratio (DRv/DRh) of the laminate is from 1.3 to 10, the ratio being the ratio of the diffusivity (DRv) of reflected light which is measured with an angle-variable photometer when the incidence angle is set to 15 degrees in the state where a sample is fixed to set the orientation direction of the dispersed phases or the co-continuous-phase of the film to the vertical direction to the diffusivity (DRv) of reflected light measured in the above-mentioned same manner in the state where the sample is fixed to set the orientation direction of the dispersed phases or the co-continuous-phase of the film to the horizontal direction; and reflectivity and diffusivity (DRv) of the anisotropic light-diffusing side of the laminate, which is measured by a method described in detail in Examples, are from 0.5 to 8 and 10 to 30, respectively. DRv and DRh are measured by a method explained in detail in Examples.

The diffusivity ratio is a scale of the anisotropy degree of the light reflection. The anisotropy is larger as the numerical value thereof is larger. When the anisotropy is made high, the reflectivity of the anisotropic light-reflecting laminate is made high so that a high reflectivity can be obtained while a high diffusivity is maintained; this matter is to be described in detail in examples. Although the reason therefor is unknown, it is presumed that when the anisotropy is imparted, the reflected light is condensed in a specific direction so that the light condensing effect makes the reflectivity high in the specific direction.

The diffusivity ratio is more preferably from 1.4 to 10, more preferably from 1.5 to 10.

If the diffusivity ratio is less than 1.3, the improving effect on reflectivity declines. On the other hand, as the upper limit thereof is higher, a more preferable result is obtained. In the invention, however, the upper limit which can be attained by any economical method is about 10.

The reflectivity is a value measured in the main diffusion direction.

It is important that the reflectivity and the diffusivity at the anisotropic light diffusion side are from 0.5 to 8 and from 10 to 30, respectively.

The reflectivity is more preferably from 0.7 to 8, even more preferably from 0.9 to 8. If the reflectivity is less than 0.5, the light reflectivity is low. Thus, when the laminate is used as a reflecting sheet, the sheet unfavorably makes the illuminance or brightness of a lighting equipment low. About the upper limit, a better result is obtained as the limit is higher. However, in the method of the invention, the upper limit would be about 8 at maximum.

The diffusivity is more preferably from 11 to 30, even more preferably from 12 to 30. If the diffusivity is less than 10, the diffusivity of the reflected light is low so that the directivity becomes strong. Thus, the laminate unfavorably makes the evenness of the illuminance or brightness of a lighting equipment low. Moreover, the glaringness of the reflected light increases so that a mild reflection, which is required for indoor lighting or the like, is unfavorably damaged. About the upper limit, a better result is obtained as the limit is higher. However, in the method of the invention, the upper limit would be about 10 at maximum.

When the laminate satisfies the above-mentioned two properties, two of the reflectivity and the diffusivity become high; thus, although the reflectivity is high, the evenness of the reflection is kept. That is, the illuminance or brightness of a lighting equipment can be made high without decreasing the evenness of the illuminance or brightness. Also, the laminate can give mild and high illuminance or brightness thereto.

The anisotropic light-reflecting laminate yielded by the invention can be preferably used as a light reflector of a lighting equipment or display device. In this use, it is preferred to use the laminate under a consideration for making it possible to make effective use of the anisotropy of light diffusion in the same way as in the case of using the above-mentioned anisotropic light-diffusing film or anisotropic light-diffusing laminate.

The invention also includes an embodiment wherein a combination of the anisotropic light-reflecting laminate with the anisotropic light-diffusing film or anisotropic light-diffusing laminate is used. This embodiment is one of a preferred embodiment since this use makes it possible to further promote the advantageous effects of the invention.

EXAMPLES

Hereinafter, the invention will be specifically described by way of examples. However, the invention is not limited by the examples. Such examples may be carried out in the state where an appropriate modification or variation is added thereto as far as the modified or varied examples can conform to the spirit of the invention. Any one of them is included in the technical scope of the invention. Measuring or evaluating methods adopted in the examples are as described below. In the examples, the word "part(s)" means "part(s) by mass" unless otherwise specified, and the word "%" means "% by mass" unless otherwise specified.

1. Measurement of the Diffusivity and the Diffusivity Ratio of Transmitted Light An automatic angle-variable photometer (GP-200: manufactured by Murakami Color Research Laboratory Co., Ltd.) is used to make a measurement.

Determined are the angle range (degrees) from a starting angle of a rise of a transmission peak to an ending angle of a fall thereof, the transmission peak being obtained by the measurement under the following conditions in a transmission measuring mode; and the height of the peak: light ray incidence angle: 60°; light-receiving angle: −90° to 90°; sensitivity: 150; high volton: 500; used filter: ND10; light bundle lens stop: 10.5 mm (VS-1 3.0); light-receiving lens stop: 9.1 mm (VS-3 4.0); and angle-varying interval: 0.1 degree. The angle range is the diffusivity, and the peak height is the transmittance (see FIG. 1).

The measurement is made in the state where any sample is fixed to a sample-fixing section to make the orientation direction of its dispersed phases or co-continuous-phase consistent with the vertical direction and with the horizontal direction. About any isotropic sample, which has no anisotropy, the sample is measured on the supposition that the length direction of the film or sheet corresponds to the orientation of an anisotropic sample.

The following are represented by DTv and DTh, respectively: the diffusivity of transmitted light that is measured in the state of fixing the orientation direction of the dispersed phases or co-continuous-phase to the vertical direction, or fixing the longitudinal direction of the winding to the vertical direction; and the diffusivity of transmitted light that is measured in the state of fixing the orientation direction of the dispersed phases or co-continuous-phase to the horizontal direction, or fixing the longitudinal direction of the winding to the horizontal direction. Under this situation, DTv/DTh, which is the diffusivity ratio, is determined.

The orientation direction of the dispersed phases or the co-continuous-phase is confirmed by observation with a cofocal laser microscope, or the like.

2. The Transmittance (T%v) of Transmitted Light

The following is defined as the transmittance (T%v): the ratio (%) of a peak top in an angle-variable photometer measurement chart in the main diffusion direction, the chart being obtained in the above-mentioned diffusivity-ratio-measuring method, to the full scale.

3. Total Light Ray Transmittance, Parallel Light Ray Transmittance, and Haze

A haze meter NDH-2000 manufactured by Nippon Denshoku Industries Co., Ltd. is used to measure these values in accordance with JIS K 7105-1981.

In the case of any measuring sample wherein dispersed phases or a co-continuous-phase of an anisotropic light-diffusing layer is oriented into a specific direction, use is made of measured values obtained by making the measurement in the state where the sample is fixed in a sample-fixing section to make the orientation direction parallel to the vertical direction. About any isotropic sample, which has no anisotropy, the sample is measured on the supposition that the longitudinal direction of the film or sheet corresponds to the orientation of an anisotropic sample.

4. Glossiness

A glossimeter VG2000 manufactured by Nippon Denshoku Industries Co., Ltd. is used to make a measurement in accordance with JIS Z 8741.

In the case of any measuring sample wherein dispersed phases or a co-continuous-phase of an anisotropic light-diffusing layer is oriented into a specific direction, use is made of a measured value obtained by making the measurement in the state where the sample is fixed to make the orientation direction parallel to the front and back direction of the meter. About any isotropic sample, which has no anisotropy, the sample is measured on the supposition that the longitudinal direction of the film or sheet corresponds to the orientation of an anisotropic sample.

5. Measurement of the Diffusivity Ratio and the Reflectivity of Reflected Light

An automatic angle-variable photometer (GP-200: manufactured by Murakami Color Research Laboratory Co., Ltd.) is used to make a measurement.

Figure 3:
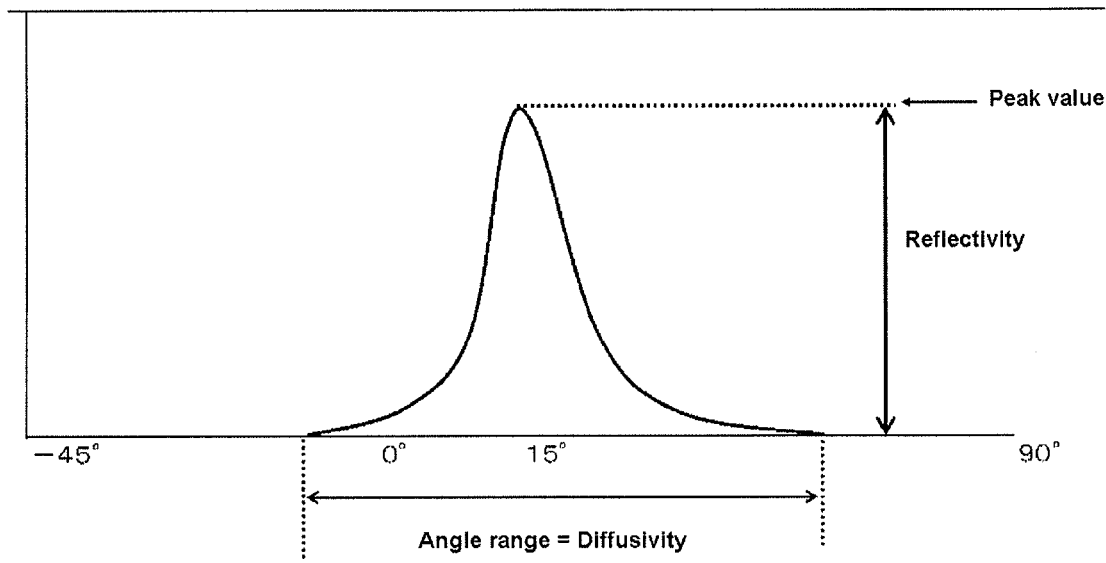
FIG. 3 is a chart showing a relationship between the reflectivity and the diffusivity in a measuring curve of an automatic angle-variable photometer at an incidence angle of 15°.

Determined are the angle range (degrees) from a starting angle of a rise of a reflection peak to an ending angle of a fall thereof, the reflection peak being obtained by the measurement under the following conditions in a reflection mode; and the height of the peak: light ray incidence angle: 15°; light-receiving angle: −90° to 90°; sensitivity: 150; high volton: 500; used filter: ND10; light bundle lens stop: 10.5 mm (VS-1 3.0); light-receiving lens stop: 9.1 mm (VS-3 4.0); and angle-varying interval: 0.1 degree. The angle range is the diffusivity, and the peak height is the reflectivity (see FIG. 3). The reflectivity is a measured value in the main diffusion direction.

The measurement is made in the state where any sample is fixed to a sample-fixing section to make the orientation direction of its dispersed phases or co-continuous-phase consistent with the horizontal direction and with the vertical direction. About any isotropic sample, which has no anisotropy, the sample is measured on the supposition that the length direction of the film or sheet corresponds to the orientation of an anisotropic sample.

Under the same conditions, a measurement is made about a reflection peak of a glossiness-measuring standard plate (G-16732; manufactured by Nippon Denshoku Industries Co., Ltd.; glossiness at an angle of 20 degrees: 82.0%). The measured value of each of the samples is represented as a value relative to the value obtained by this measurement. The measurement is made in the state where the anisotropic light-diffusing layer side is used as a measuring surface.

The following are represented by DRv and DRh, respectively: the diffusivity of reflected light that is measured in the state of fixing the orientation direction of the dispersed phases or co-continuous-phase to the vertical direction, or fixing the length direction of the film or sheet to the vertical direction; and the diffusivity of reflected light that is measured in the state of fixing the orientation direction of the dispersed phases or co-continuous-phase to the horizontal direction, or fixing the length direction of the film or sheet to the horizontal direction. Under this situation, DRv/DRh, which is the diffusivity ratio, is determined.

6. The External Appearance of the Film

A surface of any film is observed with the naked eye, and then the external appearance of the film is judged in accordance with whether or not an external appearance inferiority in a wavelet form is present. When the film is a film wherein the external appearance inferiority is not observed, the film is judged to be good. When the film is a film wherein the external appearance inferiority is observed, the film is judged to be bad.

7. Measurement of the Diffusivity Ratio and the Reflectivity of Reflected Light

An automatic angle-variable photometer (GP-200: manufactured by Murakami Color Research Laboratory Co., Ltd.) is used to make a measurement.

Determined are the angle range (degrees) from a starting angle of a rise of a reflection peak to an ending angle of a fall thereof, the reflection peak being obtained by the measurement under the following conditions in a reflection mode; and the height of the peak: light ray incidence angle: 15°; light-receiving angle: −90° to 90°; sensitivity: 150; high volton: 500; used filter: ND10; light bundle lens stop: 10.5 mm (VS-1 3.0); light-receiving lens stop: 9.1 mm (VS-3 4.0); and angle-varying interval: 0.1 degree. The angle range is the diffusivity, and the peak height is the reflectivity (see FIG. 3).

The reflectivity is a measured value in the main diffusion direction.

The measurement is made in the state where any sample is fixed to a sample-fixing section to make the orientation direction of its dispersed phases or co-continuous-phase consistent with the horizontal direction and with the vertical direction. About any isotropic sample, which has no anisotropy, the sample is measured on the supposition that the length direction of the film or sheet corresponds to the orientation of an anisotropic sample.

Under the same conditions, a measurement is made about a reflection peak of a glossiness-measuring standard plate (G-16732; manufactured by Nippon Denshoku Industries Co., Ltd.; glossiness at an angle of 20 degrees: 82.0%). The measured value of each of the samples is represented as a value relative to the value obtained by this measurement. The measurement is made in the state where the anisotropic light-diffusing layer side is used as a measuring surface.

The following are represented by DRv and DRh, respectively: the diffusivity of reflected light that is measured in the state of fixing the orientation direction of the dispersed phases or co-continuous-phase to the vertical direction, or fixing the length direction of the film or sheet to the vertical direction; and the diffusivity of reflected light that is measured in the state of fixing the orientation direction of the dispersed phases or co-continuous-phase to the horizontal direction, or fixing the length direction of the film or sheet to the horizontal direction. Under this situation, DRv/DRh, which is the diffusivity ratio, is determined.

8. Evaluation of Reflecting Property in Connection with Reflection of a Fluorescent Lamp with the Naked Eye Any light-reflecting laminate is horizontally put at a position which is just below a fluorescent lamp turned on and is separated 2 m apart from the lamp. The light-reflecting laminate is observed with the naked eye from the above thereof, and a sensory evaluation is made about the reflecting property, the spread of the reflection, and a situation that a tube shade of the fluorescent lamp is projected.

The reflecting property and the spread of the reflection are judged in accordance with the following criterion, using a light-reflecting laminate of Comparative Example 24 as a reference:
the laminate is a laminate better than the laminate of Comparative Example 24: ○,
the laminate is a laminate equivalent to the laminate of Comparative Example 24: Δ, and
the laminate is a laminate poorer than the laminate of Comparative Example 24: x.

The resistance against the projection of the tube shade is judged in accordance with the following criterion:
no projection of the tube shade is observed: ○
the projection of the tube shade is slightly observed: Δ, and
the projection of the tube shade is evidently observed: x.

In the case of any light-reflecting laminate having anisotropy in the above-mentioned evaluation, the laminate is set to make the main diffusion direction thereof parallel to the length direction of the fluorescent lamp. About any isotropic light-reflecting laminate, the laminate is set to make the longitudinal direction thereof parallel to the length direction of the fluorescent lamp.

Example 1

At 240° C., 47 parts by mass of an ethylene/butene copolymer (TOUGHMER A1085S, manufactured by Mitsui Chemicals, Inc.) were melt-mixed with 53 parts by mass of a polypropylene resin (NORBLENE FS2011DG3, manufactured by Sumitomo Chemical Co., Ltd.) in a monoaxial extruder (L/D; 22) having a diameter of 60 mm, and then the mixture was extruded through a T-die at a resin temperature of 240° C. Thereafter, the extruded mixture was cooled between casting rolls of 20° C. to yield a non-drawn sheet. Next, a difference between roll peripheral speeds of a longitudinally-drawing machine was used to drawn this non-drawn sheet 4.5 times at a drawing temperature of 118° C., and subsequently a single surface thereof was subjected to corona treatment to yield an anisotropic light-diffusing film of 200 μm thickness. The anisotropic light-diffusing film had a structure containing a continuous phase and dispersed phases, and did not substantially contain any void. The transmittance, the diffusivity and the diffusivity ratio of the anisotropic light-diffusing film yielded in the present example were each excellent. Thus, the film was high in quality (Table 1).

Comparative Example 1

Two melt-extruders were used. In a first extruder, 100 parts by mass of a polypropylene resin (NORBLENE WF836DG3, manufactured by Sumitomo Chemical Co., Ltd.) were melted to form a base layer A. In a second extruder, 17 parts by mass of a polypropylene resin (NORBLENE WF836DG3, manufactured by Sumitomo Chemical Co., Ltd.) were melt-mixed with 83 parts by mass of a propylene/ethylene copolymer (HF3101C, manufactured by Japan Polypropylene Corporation) to form an anisotropic light-diffusing layer B. In a dice, the layers were melt-co-extruded in a T-die manner so as to be made into the form of A/B. Thereafter, the workpiece was cooled between casting rolls of 20° C. to yield a non-drawn sheet. Next, a difference between roll peripheral speeds of a longitudinally-drawing machine was used to draw this non-drawn sheet 4.8 times at a drawing temperature of 120° C., and subsequently a tenter type drawing machine was used to heat the workpiece at 165° C. and drawn the workpiece 9 times into the transverse direction at a drawing temperature of 155° C. Next, the workpiece was subjected to thermal fixation at 166° C. to yield an anisotropic light-diffusing film having a constitution of A/B, wherein the thickness of the A layer and that of the B layer were 22.2 μM and 2.8 μm, respectively. Just before the film was wound, the surface of the base layer A was subjected to corona treatment. The diffusivity ratio and transmittance of the light-diffusing film yielded in the present comparative example were low. Thus, the film was low in quality (Table 1).

Example 2

Into a monoaxial extruder was supplied a mixture of 95 parts by mass of a polyethylene terephthalate resin and 5 parts by mass of a low-density polyethylene resin (SP1540) manufactured by Prime Polymer Co., Ltd., the mixture being dried at 180° C. in a vacuum drier for 3 hours to remove water therein sufficiently, and being substantially lubricant-free. The mixture was melted at 280° C., and passed through a filter and a gear pump to remove foreign substances and make the extrusion amount even. Thereafter, a T-die was used to extrude out the mixture into a sheet form on a cooling drum, the temperature of which was controlled to 25° C. At this time, wire electrodes each having a diameter of 0.1 mm were used to apply static electricity thereto so as to cause the sheet closely to adhere onto the cooling drum. In this way, a non-drawn film was yielded. Next, the film was drawn 3.0 times in the longitudinal direction thereof at a temperature of 103° C. to yield an anisotropic light-diffusing film of 75 μm thickness. The transmittance, the diffusivity and the diffusivity ratio of the anisotropic light-diffusing film yielded in the present example were each excellent. Thus, the film was high in quality (Table 1).

Comparative Example 2

Into a monoaxial extruder was supplied a mixture of 95 parts by mass of a polyethylene terephthalate resin and 5 parts by mass of a low-density polyethylene resin (SP1540) manufactured by Prime Polymer Co., Ltd., the mixture being dried at 180° C. in a vacuum drier for 3 hours to remove water therein sufficiently, and being substantially lubricant-free. The mixture was melted at 280° C., and passed through a filter and a gear pump to remove foreign substances and make the extrusion amount even. Thereafter, a T-die was used to extrude out the mixture into a sheet form on a cooling drum, the temperature of which was controlled to 25° C. At this time, wire electrodes each having a diameter of 0.1 mm were used to apply static electricity thereto so as to cause the sheet closely to adhere onto the cooling drum. In this way, a non-drawn film was yielded. Next, the film was drawn 3.0 times in the longitudinal direction thereof at a temperature of 103° C., and subsequently a tenter type transverse drawing machine was used to drawn the film 3.0 times in the width direction at a pre-heating temperature of 95° C. and a drawing temperature of 115° C. While the film was kept in the tenter as it was and a relaxation of 6% was applied thereto along the width direction, the film was thermally treated at a temperature of 210° C. for 4 seconds to yield a light-diffusing film of 25 μm thickness. The anisotropic light-diffusing film did not substantially contain any void. The light-diffusing film yielded in the present comparative example was lower in each of transmittance, diffusivity and diffusivity ratio than the anisotropic light-diffusing film yielded in Example 2. Thus, the present film was low in quality (Table 1).

Comparative Examples 3 to 7

A coating method was used to laminate a diffusion layer composed of polystyrene polymer beads and an acrylic resin onto a single surface of each of polyester films each having a thickness of 100 μm, thereby to yield a light-diffusing film. The light-diffusing films yielded in the present comparative examples were each low in diffusivity ratio, and were each not good in balance between the transmittance and the diffusivity (Table 1).

Example 3

An anisotropic light-diffusing film was yielded in the same way as in Example 1 except that use was made of the non-drawn film which was not yet drawn in the process of Example 1. The transmittance, the diffusivity and the diffusivity ratio of the anisotropic light-diffusing film yielded in the present example were each excellent. Thus, the film was high in quality (Table 1).

Example 4

The monoaxially drawn film prepared in Example 1 was further drawn 3.5 times in the transverse direction at a drawing temperature of 105° C. to yield an anisotropic light-diffusing film. The transmittance, the diffusivity and the diffusivity ratio of the anisotropic light-diffusing film yielded in the present example were each excellent. Thus, the film was high in quality (Table 1).

Example 5

An anisotropic light-diffusing film was yielded in the same way as in Example 1 except that the resin composition in the process of Example 1 was changed to 65 parts by mass of a polypropylene resin (NORBLENE FS2011DG3, manufactured by Sumitomo Chemical Co., Ltd.) and 35 parts by mass of a propylene/butene copolymer (TOUGHMER P0280, manufactured by Mitsui Chemicals, Inc.). The transmittance, the diffusivity and the diffusivity ratio of the anisotropic light-diffusing film yielded in the present example were each excellent. Thus, the film was high in quality (Table 1).

Example 6

An anisotropic light-diffusing film was yielded in the same way as in Example 1 except that the resin composition in the process of Example 1 was changed to 65 parts by mass of a polypropylene resin (NORBLENE FS2011DG3, manufactured by Sumitomo Chemical Co., Ltd.) and 35 parts by mass of a block copolymer resin (INFUSE™ D9807. 15, manufactured by the Dow Chemical Corporation) made from ethylene and octene. The transmittance, the diffusivity and the diffusivity ratio of the anisotropic light-diffusing film yielded in the present example were each excellent. Thus, the film was high in quality (Table 2).

Example 7

An anisotropic light-diffusing film was yielded in the same way as in Example 1 except that the resin composition in the process of Example 1 was changed to 65 parts by mass of a polypropylene resin (NORBLENE FS2011DG3, manufactured by Sumitomo Chemical Co., Ltd.) and 35 parts by mass of a block copolymer resin (INFUSE™ D9107. 10, manufactured by the Dow Chemical Corporation) made from ethylene and octene. The transmittance, the diffusivity and the diffusivity ratio of the anisotropic light-diffusing film yielded in the present example were each excellent. Thus, the film was high in quality (Table 2).

Example 8

An anisotropic light-diffusing film was yielded in the same way as in Example 1 except that the resin composition in the process of Example 1 was changed to a blend wherein 50 parts by mass of a polypropylene resin (NORBLENE FS2011DG3, manufactured by Sumitomo Chemical Co., Ltd.) were blended with 50 parts by mass of a high-density polyethylene resin (HI-ZEX 2208J, manufactured by Prime Polymer Co., Ltd.). The transmittance, the diffusivity and the diffusivity ratio of the anisotropic light-diffusing film yielded in the present example were each excellent. Thus, the film was high in quality (Table 2).

Example 9

An anisotropic light-diffusing film was yielded in the same way as in Example 1 except that the resin composition in the process of Example 1 was changed to 65 parts by mass of a polypropylene resin (NORBLENE FS2011DG3, manufactured by Sumitomo Chemical Co., Ltd.) and 35 parts by mass of a low-density polyethylene resin (Envolue SP1540, manufactured by Prime Polymer Co., Ltd.). The transmittance, the diffusivity and the diffusivity ratio of the anisotropic light-diffusing film yielded in the present example were each excellent. Thus, the film was high in quality (Table 2).

Example 10

An anisotropic light-diffusing film was yielded in the same way as in Example 1 except that the resin composition in the process of Example 1 was changed to 65 parts by mass of a polypropylene resin (NORBLENE FS2011DG3, manufactured by Sumitomo Chemical Co., Ltd.) and 35 parts by mass of a low-density polyethylene resin (ULT-ZEX 4020L, manufactured by Prime Polymer Co., Ltd.). The transmittance, the diffusivity and the diffusivity ratio of the anisotropic light-diffusing film yielded in the present example were each excellent. Thus, the film was high in quality (Table 2).

Examples 11 and 12

Two films and 4 films of the anisotropic light-diffusing film yielded in Example 7 were respectively laminated onto each other, and then optical properties of the respective resultant laminates were measured. About the anisotropic light-diffusing films of these examples, the diffusivity was better than that of the anisotropic light-diffusing film yielded in Example 7 (Table 2).

Example 13

A tenter type drawing machine was used to heat the monoaxially drawn film prepared in Example 9 further at 167° C. and then draw the film 4.5 times in the transverse direction at a drawing temperature of 155° C. to yield an anisotropic light-diffusing film. The transmittance, the diffusivity and the diffusivity ratio of the anisotropic light-diffusing film yielded in the present example were each excellent. Thus, the film was high in quality (Table 2).

Example 14

A tenter type drawing machine was used to heat the monoaxially drawn film prepared in Example 10 further at 167° C. and then draw the film 4.5 times in the transverse direction at a drawing temperature of 155° C. to yield an anisotropic light-diffusing film. The transmittance, the diffusivity and the diffusivity ratio of the anisotropic light-diffusing film yielded in the present example were each excellent. Thus, the film was high in quality (Table 2).

FIG. 2 shows the transmittances of the anisotropic light-diffusing films yielded in the above-mentioned examples and comparative examples, and a relationship between the diffusivities (DTv) and the transmittances (T%v) in the main diffusion direction thereof.

It can be understood that the anisotropic light-diffusing films of the invention are each within a critical range wherein the diffusivity and the transmittance thereof are higher than those of light-diffusing films having isotropy (diffusivity: less than 1.3) so that compatibility between the diffusivity and the transmittance is attained.

Examples 15 and 16

The anisotropic light-diffusing films of Examples 1 and 7 were each bonded onto an acrylic plate having a thickness of 2 mm and a total light ray transmittance of 93% through an optical double-sided pressure sensitive adhesive sheet interposed therebetween to yield an anisotropic light-diffusing laminate.

The resultant anisotropic light-diffusing laminates were each used as a diffusing plate for a fluorescent lamp. In this case, the laminate was set to make the main diffusion direction of its anisotropic light-diffusing film parallel to the length direction of the fluorescent lamp. The laminate was high in brightness, and good in diffusivity, so that no tube shade of the fluorescent lamp was viewed.

Comparative Example 8

A laminate was used as a diffusing plate for a fluorescent lamp in the same way as in Examples 15 and 16 except that the anisotropic light-diffusing film in any one of the processes of Examples 15 and 16 was changed to the light-diffusing film yielded in Comparative Example 1.

In the same manner as in Examples 15 and 16, the laminate was excellent in diffusivity, and no tube shade of the fluorescent lamp was viewed. However, the laminate was poorer in transmittance than the laminates of the examples, so that the brightness largely lowered.

Comparative Example 9

A laminate was used as a diffusing plate for a fluorescent lamp in the same way as in Examples 15 and 16 except that the anisotropic light-diffusing film in any one of the processes of Examples 15 and 16 was changed to the light-diffusing film yielded in Comparative Example 4.

In the same manner as in Examples 15 and 16, the laminate was good in transmittance, so as to be good in brightness; however, the laminate was poor in diffusivity so that a tube shape of the fluorescent lamp was viewed.

Comparative Example 10

A laminate was used as a diffusing plate for a fluorescent lamp in the same way as in Examples 15 and 16 except that the anisotropic light-diffusing film in any one of the processes of Examples 15 and 16 was changed to the light-diffusing film yielded in Comparative Example 7.

In the same manner as in Examples 15 and 16, the laminate was excellent in diffusivity so that no tube shade of the fluorescent lamp was viewed. However, the laminate was poorer in transmittance than the laminates of the examples, so that the brightness largely lowered.

Example 17

The anisotropic light-diffusing film yielded in Example 1 was bonded onto a dot-type light-conducting plate wherein a single fluorescent lamp as an edge light and a white reflecting plate were used through an optical double-sided pressure sensitive adhesive tape interposed therebetween, so as to make the main diffusion direction of the anisotropic light-diffusing film parallel to the length direction of the fluorescent lamp. The brightness thereof was then measured.

The brightness was measured at a position which was separated 40 cm apart from the front surface of the light-conducting plate and was just above the light-conducting plate, using a Topcon spectroscopic radiometer SR-3A manufactured by Topcon Technohouse Corporation.

The brightness was 1.7 $Cd/m^2 \times 10^2$. However, when the anisotropic light-diffusing film was not bonded thereto, the brightness was 0.3 $Cd/m^2 \times 10^2$.

Comparative Examples 11 and 12

The process of Example 17 was changed to bond the light-diffusing film yielded in each of Comparative Examples 1 and 6. In the same way as in Example 17 except this change, the brightness was measured. The resultant brightnesses were 0.6 and 0.8 Cd/m$^2$×10$^2$, respectively. The effect of improving the brightness was remarkably poorer than that of Example 17.

Reference Example 1

In the same manner as in Example 17, the brightness was measured except that the anisotropic light-diffusing film in Example 17 was bonded so as to make the main diffusion direction thereof orthogonal to the length direction of the fluorescent lamp. The resultant brightness was 0.6 Cd/m$^2$×10$^2$, and the effect of improving the brightness was remarkably poorer than that of Example 17.

Example 18 and Comparative Example 13

In the same manner as in Example 17, the brightness was measured except that in the process of Example 17, two films of the anisotropic light-diffusing film yielded in Example 1 were put and bonded onto each other in the same direction as in Example 17. The brightness was 2.5 Cd/m$^2$×10$^2$, and was even better than that of Example 17.

On the other hand, in the process of Example 17, two films of the light-diffusing film yielded in Comparative Example 12 were put and bonded onto each other. In this case, the brightness was 0.9 Cd/m$^2$×10$^2$. Thus, an effect based on the putting and bonding onto each other was hardly produced.

As described above, the use of the anisotropic light-diffusing films made it possible to improve the brightness of the light-conducting plate. The reason therefor is unclear; however, it is presumed that an effect that light is condensed in a specific direction by the imparting of anisotropy, i.e., the so-called lens effect is expressed.

Examples 19 and 20

In the same manner as in Example 17, the brightness was measured except that in the process of Example 17, the anisotropic light-diffusing film of each of Examples 5 and 6 was bonded in the same direction as in Example 17. The resultant brightnesses were 1.7 and 2.0 Cd/m$^2$×10$^2$, respectively. In the same manner as about the anisotropic light-diffusing film yielded in Example 1, the brightness-improving effect was large.

Example 21

[Preparation of an Anisotropic Light-Diffusing Film]
At 240° C., 47 parts by mass of an ethylene/butene copolymer (TOUGHMER A1085S, manufactured by Mitsui Chemicals, Inc.) were melt-mixed with 53 parts by mass of a polypropylene resin (NORBLENE FS2011DG3, manufactured by Sumitomo Chemical Co., Ltd.) in a monoaxial extruder (L/D; 22) having a diameter of 60 mm, and then the mixture was extruded through a T-die at a resin temperature of 240° C. Thereafter, the extruded mixture was cooled between casting rolls of 20° C. to yield a non-drawn sheet. Next, a difference between roll peripheral speeds of a longitudinally-drawing machine was used to drawn this non-drawn sheet 4.5 times at a drawing temperature of 118° C., and subsequently a single surface thereof was subjected to corona treatment to yield an monoaxially drawn film of 200 thickness. The anisotropic light-diffusing film had a structure containing a continuous phase and dispersed phases, and did not substantially contain any void.

[Light Reflector Containing Metallic Layer]
Prepared was an aluminum-metal-deposited polyester film wherein metallic aluminum was vapor-deposited into a thickness of 80 nm on a biaxially drawn polyester film (A4300, 100 μm) manufactured by Toyobo Co., Ltd.
[Preparation of an Anisotropic Light-Reflecting Laminate]
The anisotropic light-diffusing film prepared by the above-mentioned method was bonded onto the aluminum-deposited surface of the aluminum-metal-deposited film through an optical double-sided pressure sensitive adhesive sheet interposed therebetween. The diffusivity ratio of the anisotropic light-reflecting laminate was 5.7. The light-reflecting laminate yielded in the present example was excellent in both of reflectivity and diffusivity. Thus, the laminate was high in quality (Table 3).

Comparative Example 14

Although only the aluminum-metal-deposited polyester film was very high in reflectivity, the film was low in diffusivity, and the resistance against the projection of a tube shade of a fluorescent lamp was poor (Table 3).

Comparative Example 15

Only the anisotropic light-diffusing film of Example 21 was remarkably poor in reflectivity (Table 3).

Comparative Example 16

A light-reflecting laminate was yielded in the same way as in Example 21 except that a biaxially drawn polypropylene film (P2241, 25 μm) of a transparent type manufactured by Toyobo Co., Ltd. was used instead of the anisotropic light-diffusing film in the process of Example 21. The diffusivity ratio was 1.0, so that no anisotropy was observed. Although the light-reflecting laminate yielded in the present comparative example was good in reflectivity, the laminate was low in diffusivity, and the resistance against the projection of a tube shade of a fluorescent lamp was poor (Table 3).

Comparative Example 17

A light-reflecting laminate was yielded in the same way as in Example 21 except that a white biaxially drawn polypropylene film (P4835, 39 μm thickness) of a foaming type manufactured by Toyobo Co., Ltd. was used instead of the anisotropic light-diffusing film in the process of Example 21. The diffusivity ratio was 1.0, so that no anisotropy was observed. Although the light-reflecting laminate yielded in the present comparative example was good in diffusivity, the laminate was remarkably low in reflectivity (Table 3).

Comparative Example 18

An anisotropic light-diffusing film was yielded in the same way as in Example 21 except that a light-diffusing film prepared by a method described below was used in the process of Example 21. The diffusivity ratio was 1.2 so that the film was low in anisotropy. The light-reflecting laminate yielded in the present comparative example was low in reflectivity (Table 3).
(Preparation of a Light-Diffusing Film)
Two melt-extruders were used. In a first extruder, 100 parts by mass of a polypropylene resin (NORBLENE WF836DG3, manufactured by Sumitomo Chemical Co., Ltd.) were melted to form a base layer A. In a second extruder, 17 parts by mass of a polypropylene resin (NORBLENE WF836DG3, manufactured by Sumitomo Chemical Co., Ltd.) were melt-mixed with 83 parts by mass of a propylene/ethylene copolymer (HF3101C, manufactured by Japan Polypropylene Corporation) to form an anisotropic light-diffusing layer B. In a dice, the layers were melt-co-extruded in a T-die manner so as to be made into the form of A/B. Thereafter, the workpiece was cooled between casting rolls of 20° C. to yield a non-drawn sheet. Next, a difference between roll peripheral speeds of a longitudinally-drawing machine was used to draw this non-drawn sheet 4.8 times at a drawing temperature of 120° C., and subsequently a tenter type drawing machine was used to heat the workpiece at 165° C. and drawn the workpiece 9 times into the transverse direction at a drawing temperature of 155° C. Next, the workpiece was subjected to thermal fixation at 166° C. to yield a light-diffusing film having a constitution of A/B, wherein the thickness of the A layer and that of the B layer were 22.2 μm and 2.8 μm, respectively. Just before the film was wound, the surface of the base layer A was subjected to corona treatment.

Example 22

An anisotropic light-reflecting laminate was yielded in the same way as in Example 21 except that a reflection-enhancing type aluminum reflecting plate (V95-110) manufactured by Almeco was used as the light reflector containing a metallic layer in the process of Example 21. The diffusivity ratio of the present anisotropic light-reflecting laminate was 5.8. The light-reflecting laminate yielded in the present example had a better reflecting property than the anisotropic light-reflecting laminate yielded in Example 21. Thus, the laminate was high in quality (Table 3).

Example 23

An anisotropic light-reflecting laminate was yielded in the same way as in Example 21 except that a polyester film wherein metallic silver was laminated into a thickness of 150 nm on a biaxially drawn polyester film (A4300, 100 μm) manufactured by Toyobo Co., Ltd. by sputtering was used as the light reflector in the process of Example 21. The diffusivity ratio of the present anisotropic light-reflecting laminate was 5.9. The light-reflecting laminate yielded in the present example had a better reflecting property than the anisotropic light-reflecting laminate yielded in Example 21. Thus, the laminate was high in quality (Table 3).

Example 24

An anisotropic light-reflecting laminate was yielded by vapor-depositing metallic aluminum into a thickness of 150 nm onto a singe surface of the anisotropic light-diffusing film prepared in the process of Example 21. The diffusivity ratio of the present anisotropic light-reflecting laminate was 5.7. The light-reflecting laminate yielded in the present example had a reflecting property equivalent to the light-reflecting laminate yielded in Example 21. Thus, the laminate was high in quality (Table 3).

Example 25

An anisotropic light-reflecting laminate was yielded in the same way as in Example 21 except that an anisotropic light-diffusing film prepared by a method described below was used as the anisotropic light-diffusing film in the process of Example 21. The diffusivity ratio of the present anisotropic light-reflecting laminate was 4.8. The anisotropic light-reflecting laminate yielded in the present example was excellent in both reflectivity and diffusivity (Table 3).
[Preparation of a Light-Diffusing Film]

Into a monoaxial extruder was supplied a mixture of 95 parts by mass of a polyethylene terephthalate resin and 5 parts by mass of a low-density polyethylene resin (SP1540) manufactured by Prime Polymer Co., Ltd., the mixture being dried at 180° C. in a vacuum drier for 3 hours to remove water therein sufficiently, and being substantially lubricant-free. The mixture was melted at 280° C., and passed through a filter and a gear pump to remove foreign substances and make the extrusion amount even. Thereafter, a T-die was used to extrude out the mixture into a sheet form on a cooling drum, the temperature of which was controlled to 25° C. At this time, wire electrodes each having a diameter of 0.1 mm were used to apply static electricity thereto so as to cause the sheet closely to adhere onto the cooling drum. In this way, a non-drawn film was yielded. Next, the film was drawn 3.0 times in the longitudinal direction thereof at a temperature of 103° C. to yield an anisotropic light-diffusing film of 75 μM thickness, containing a continuous phase and dispersed phases.

Comparative Example 19

A light-reflecting laminate was yielded in the same way as in Example 21 except that a light-diffusing film prepared by a method described below was used instead of the anisotropic light-diffusing film in the process of Example 21. The diffusivity ratio of the light-reflecting laminate was 1.0. Thus, no anisotropy was observed. The anisotropic light-reflecting laminate yielded in the present comparative example was poor in reflectivity (Table 3).
[Preparation of a Light-Diffusing Film]

Into a monoaxial extruder was supplied a mixture of 95 parts by mass of a polyethylene terephthalate resin and 5 parts by mass of a low-density polyethylene resin (SP1540) manufactured by Prime Polymer Co., Ltd., the mixture being dried at 180° C. in a vacuum drier for 3 hours to remove water therein sufficiently, and being substantially lubricant-free. The mixture was melted at 280° C., and passed through a filter and a gear pump to remove foreign substances and make the extrusion amount even. Thereafter, a T-die was used to extrude out the mixture into a sheet form on a cooling drum, the temperature of which was controlled to 25° C. At this time, wire electrodes each having a diameter of 0.1 mm were used to apply static electricity thereto so as to cause the sheet closely to adhere onto the cooling drum. In this way, a non-drawn film was yielded. Next, the film was drawn 3.0 times in the longitudinal direction thereof at a temperature of 103° C., and subsequently a tenter type transverse drawing machine was used to drawn the film 3.0 times in the width direction at a pre-heating temperature of 95° C. and a drawing temperature of 115° C. While the film was kept in the tenter as it was and a relaxation of 6% was applied thereto along the width direction, the film was thermally treated at a temperature of 210° C. for 4 seconds to yield a light-diffusing film of 25 μm thickness. The light-diffusing film did not substantially contain any void.

Comparative Example 20

A light-reflecting laminate was yielded in the same way as in Example 21 except that a biaxially drawn polyester film (E5100, 125 μm) manufactured by Toyobo Co., Ltd. was used instead of the anisotropic light-diffusing film in the process of Example 21. The diffusivity ratio of the light-reflecting laminate was 1.0. Thus, no anisotropy was observed. The light-reflecting laminate yielded in the present comparative example was good in reflectivity, but low in diffusivity, and the resistance against the projection of a tube shade of a fluorescent lamp was poor (Table 3).

Comparative Examples 21 to 25

Each polyester light-diffusing film was put, so as to yield a light-reflecting laminate, the film having optical properties shown in Table 3 and being yielded by laminating a diffusing layer composed of polystyrene polymer beads and an acrylic resin onto a single surface of a polyester film of 100 μm thickness by a coating method. The putting of the film was attained by bringing the side opposite to the diffusing layer of this film into contact with the aluminum-deposited surface of the light reflector. The diffusivity ratio of the light-reflecting laminate was 1.0; thus, no anisotropy was observed. Characteristics of the resultant light-reflecting laminates are shown in Tables 3 and 4. The light-reflecting laminates yielded in Comparative Examples 20 to 23 were low in diffusivity. The light-reflecting laminates yielded in Comparative Examples 24 and 25 were low in reflectivity. Furthermore, the light-reflecting laminates yielded in these comparative examples were each remarkably poor in diffusivity ratio, so as to be unsuitable for any use for which anisotropic light diffusivity was required.

Comparative Example 26

A light-reflecting laminate was yielded in the same way as in Example 21 except that a white polyester film prepared by a method described below was used instead of the anisotropic light-diffusing film in the process of Example 21. The diffusivity ratio of the light-reflecting laminate was 1.0, and no anisotropy was observed. The light-reflecting laminate yielded in the present comparative example was good in diffusivity, but remarkably low in reflectivity (Table 4).
[Preparation of a Light-Diffusing Film]

Into a monoaxial extruder was supplied a mixture of 70 parts by mass of a polyethylene terephthalate resin and 30 parts by mass of titanium-oxide-containing master pellets, the mixture being dried at 180° C. in a vacuum drier for 3 hours to remove water therein sufficiently, and being substantially lubricant free, and the pellets being obtained by kneading 50 parts by mass of titanium oxide and 50 parts by mass of the same polyethylene terephthalate resin as above. The mixture was melted at 280° C., and passed through a filter and a gear pump to remove foreign substances and make the extrusion amount even. Thereafter, a T-die was used to extrude out the mixture into a sheet form onto a cooling drum, the temperature of which was controlled to 25° C. At this time, wire electrodes each having a diameter of 0.1 mm were used to apply static electricity thereto so as to cause the sheet closely to adhere onto the cooling drum. In this way, a non-drawn film was yielded. Next, the film was drawn 3.0 times in the longitudinal direction thereof at a temperature of 103° C., and subsequently a tenter type transverse drawing machine was used to drawn the film 3.0 times in the width direction at a pre-heating temperature of 95° C. and a drawing temperature of 115° C. While the film was kept in the tenter as it was and a relaxation of 6% was applied thereto along the width direction, the film was thermally treated at a temperature of 210° C. for 4 seconds to yield a white polyester film of 100 μm thickness.

Comparative Example 27

A light-reflecting laminate was yielded in the same way as in Example 21 except that a void-containing-type white biaxially drawn polyester film (CRISPER (Registered Trademark) G1211, 38 μm) manufactured by Toyobo Co., Ltd. was used instead of the anisotropic light-diffusing film in the process of Example 21. The diffusivity ratio of the light-reflecting laminate was 1.0. Thus, no anisotropy was observed. The light-reflecting laminate yielded in the present comparative example was good in diffusivity, but remarkably poor in reflectivity (Table 4).

Example 26

An anisotropic light-reflecting laminate was yielded in the same way as in Example 21 except that the non-drawn film in Example 21, which was the anisotropic light-diffusing film not yet drawn in Example 21, was used instead of the anisotropic light-diffusing film in the process of Example 21. The diffusivity ratio was 3.9. The anisotropic light-reflecting laminate yielded in the present example was excellent both in reflectivity and diffusivity (Table 4).

Example 27

An anisotropic light-reflecting laminate was yielded in the same way as in Example 21 except that instead of the anisotropic light-diffusing film in the process of Example 21, use was made of a biaxially drawn film obtained by using a tenter type drawing machine to heat the monoaxially drawn film prepared in Example 21 further at 158° C. and then drawn the film 3.5 times in the transverse direction at a drawing temperature of 145° C. The diffusivity ratio was 2.3. The anisotropic light-reflecting laminate yielded in the present example was excellent both in reflectivity and diffusivity (Table 4).

Also, an anisotropic light-diffusing film was prepared by the method described below.
[Preparation of an Anisotropic Light-Diffusing Film]

At 240° C., 47 parts by mass of an ethylene/butene copolymer (TOUGHMER A1085S, manufactured by Mitsui Chemicals, Inc.) were melt-mixed with 53 parts by mass of a polypropylene resin (NORBLENE FS2011DG3, manufactured by Sumitomo Chemical Co., Ltd.) in a monoaxial extruder (L/D; 22) having a diameter of 60 mm, and then the mixture was extruded through a T-die at a resin temperature of 240° C. Thereafter, the extruded mixture was cooled between casting rolls of 20° C. to yield a non-drawn sheet. Next, a difference between roll peripheral speeds of a longitudinally-drawing machine was used to draw this non-drawn sheet 4.5 times at a drawing temperature of 118° C., and subsequently a tenter type drawing machine was used to heat the sheet at 167° C. and then draw the sheet 8 times in the transverse direction at a drawing temperature of 155° C. Next, the workpiece was subjected to thermal fixation at 165° C. to yield an anisotropic light-diffusing film of 50 μm thickness. Just before the film was wound, a single surface of the film was subjected to corona treatment. The anisotropic light-diffusing film had a structure containing a continuous phase and dispersed phases, and did not substantially contain any void.

Example 28

An anisotropic light-reflecting laminate was yielded in the same way as in Example 27 except that a reflection-enhancing type aluminum reflecting plate (V95-110) manufactured by Almeco was used as the light reflector containing a metallic layer in the process of Example 27. The diffusivity ratio was 3.4. The light-reflecting laminate yielded in the present example had a better reflecting property than the anisotropic light-reflecting laminate yielded in Example 27. Thus, the laminate was high in quality (Table 4).

Example 29

An anisotropic light-reflecting laminate was yielded in the same way as in Example 21 except that the resin composition in the preparation of the anisotropic light-diffusing film in the process of Example 21 was changed to 65 parts by mass of a polypropylene resin (NORBLENE FS2011DG3, manufactured by Sumitomo Chemical Co., Ltd.) and 35 parts by mass of a low-density polyethylene (SP1540; MFR: 3.8 g/10 minutes; the melting point Tm: 113° C.; density: 0.913 g/cm$^3$). The diffusivity ratio was 6.9. The anisotropic light-reflecting laminate yielded in the present example was excellent in both reflectivity and diffusivity (Table 4).

Example 30

An anisotropic light-reflecting laminate was yielded in the same way as in Example 21 except that the resin composition in preparation of an anisotropic light-diffusing film in the process of Example 21 was changed to 65 parts by mass of a polypropylene resin (NORBLENE FS2011DG3, manufactured by Sumitomo Chemical Co., Ltd.) and 35 parts by mass of a propylene/butene copolymer (TOUGHMER P0280, manufactured by Mitsui Chemicals, Inc.). The diffusivity ratio was 6.4. The light-reflecting laminate yielded in the present example was excellent in both reflectivity and diffusivity (Table 4).

Example 31

An anisotropic light-reflecting laminate was yielded in the same way as in Example 21 except that the resin composition in preparation of an anisotropic light-diffusing film in the process of Example 21 was changed to 65 parts by mass of a polypropylene resin (NORBLENE FS2011DG3, manufactured by Sumitomo Chemical Co., Ltd.) and 35 parts by mass of a block copolymer resin (INFUSE™ D9807. 15, manufactured by the Dow Chemical Corporation) made from ethylene and octene. The diffusivity ratio was 4.0. The anisotropic light-reflecting laminate yielded in the present example was excellent in both reflectivity and diffusivity (Table 4).

Example 32

An anisotropic light-reflecting laminate was yielded in the same way as in Example 21 except that the resin composition in preparation of an anisotropic light-diffusing film in the process of Example 21 was changed to 65 parts by mass of a polypropylene resin (NORBLENE FS2011DG3, manufactured by Sumitomo Chemical Co., Ltd.) and 35 parts by mass of a block copolymer resin (INFUSE™ D9107. 10, manufactured by the Dow Chemical Corporation) made from ethylene and octene. The diffusivity ratio was 5.3. The anisotropic light-reflecting laminate yielded in the present example was excellent in both reflectivity and diffusivity (Table 4).

Example 33

An anisotropic light-reflecting laminate was yielded in the same way as in Example 21 except that the resin composition in preparation of an anisotropic light-diffusing film in the process of Example 21 was changed to a blend wherein 50 parts by mass of a polypropylene resin (NORBLENE S2011DG3, manufactured by Sumitomo Chemical Co., Ltd.) were blended with 50 parts by mass of a high-density polyethylene resin (HI-ZEX 2208J, manufactured by Prime Polymer Co., Ltd.). The diffusivity ratio was 4.0. The anisotropic light-reflecting laminate yielded in the present example was excellent in both reflectivity and diffusivity (Table 4).

Example 34

An anisotropic light-reflecting laminate was yielded in the same way as in Example 25 except that the low-density polyethylene resin used in the preparation of the diffusing layer film in Example 25 was changed to a polypropylene resin (CAP350, manufactured by Dainichiseika Color & Chemicals Mfg. Co., Ltd.) made of a mixture of polypropylene and polybutene. The diffusivity ratio was 4.4. Characteristics of the anisotropic light-diffusing film and the anisotropic light-reflecting laminate are shown in Table 4. The anisotropic light-reflecting laminate yielded in the present example was excellent in both reflectivity and diffusivity.

Reference Example 2

About three commercially available white reflecting polyester films, the reflectivity and the diffusivity were measured.
The reflecting properties are shown in Table 5. The white reflecting films were each lower in reflectivity than the anisotropic light-reflecting laminates of the invention.

Reference Example 3

The light-reflecting laminated film or reflecting film of each of the examples, the comparative examples, and Reference Example 2 was bonded onto a reflecting plate section of an indoor lighting fluorescent lamp, and then the brightness thereof and an unevenness of the brightness were judged by a sensory evaluation.
In each of the light-reflecting laminated films yielded in the examples, reflected light rays of light from the fluorescent lamp were not glaring, and were mild. The angle-dependency of the reflected light was restrained.
On the other hand, about the light-reflecting laminates of Comparative Examples 14, 16 and 21, light rays reflected thereon were glaring, and further the illuminance was high only at a specific angle. The light-reflecting laminates of Comparative Examples 15, 19, 20 and 22 were low in reflectivity. The commercially available white reflecting films were also low in reflectivity.

Reference Example 4

An all-round light distribution property evaluating and measuring device (ZERO-FP) manufactured by Zero Core was used to measure the illuminance. The glaringness of reflected light was observed at the time of the measurement. The results are shown in Table 6.
The light-reflecting laminate of each of the examples of the invention gives a mild reflected light in the same manner as the commercially available white reflecting films of Reference Example 3 and Comparative Example 22 while the laminate is high in illuminance. However, the aluminum-metal-deposited polyester film of Comparative Example 14 has a problem that light reflected thereon is glaring while the film has a high illuminance. It can be therefore said that the light-reflecting laminates of the invention have an excellent reflecting property having both of an intense reflectivity as given by a light reflector having metallic luster, such as an aluminum-metal-deposited polyester film, and a mild reflection which is possessed by a white reflecting film.

Reference Example 5

Figure 4:
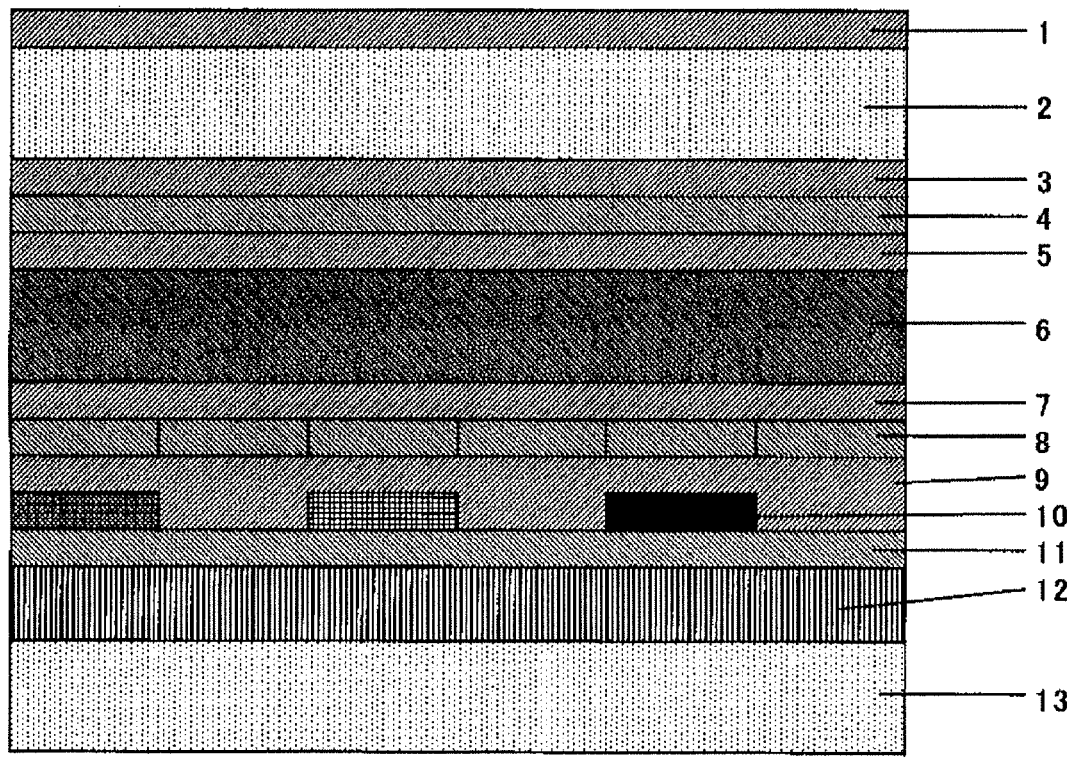
FIG. 4 is an exploded view of a liquid crystal display device section of a portable telephone having a reflective liquid crystal device.

A liquid crystal display device section of a commercially available portable telephone having a reflective liquid crystal device was resolved. The section had a structure illustrated in FIG. 4. A light reflector of the liquid crystal display device section was substituted with the light reflector of each of the examples of the invention, the comparative examples, and Reference Examples 2 to 4, and then the viewablity of its display screen through reflection of external light was subjected to a sensory evaluation. In the case of any one of the anisotropic light-reflecting laminates, the laminate was arranged to make the direction of the orientation axis of its dispersed phases or co-continuous-phase consistent with the transverse direction of the liquid crystal display device. About the anisotropic light-reflecting laminates yielded in the examples of the invention, the display was brightly and vividly viewed. However, about the comparative examples and the white reflecting films of the reference examples, wherein the reflectivity was low, the brightness was insufficient and the display was not easily viewed. In the case of using the aluminum-metal-deposited polyester film of Comparative Example 14, the incidence-angle-dependency was high. Thus, depending on the direction of the incidence of external light, the brightness was insufficient, and the display was not easily viewed locally.

FIG. 6 shows a relationship between the diffusivities (DRh) and the reflectivities of the anisotropic light-reflecting laminates and the light reflectors yielded in the examples, the comparative examples, and the reference examples.

It can be understood that the anisotropic light-reflecting laminates of the invention are higher in diffusivity and reflectivity than the light reflectors having isotropy (diffusivity: less than 1.3), so as to be within a critical range in which compatibility between the diffusivity and the reflectivity can be attained.

TABLE 1

| | Total light ray transmittance (%) | Parallel light ray transmittance (%) | Haze (%) | Glossiness (%) | Diffusivity DTv | Diffusivity DTh | Diffusivity ratio DTv/DTh | Transmittance T % v |
|---|---|---|---|---|---|---|---|---|
| Ex. 1 | 90.3 | 69.7 | 22.9 | 21.9 | 86 | 20 | 4.3 | 40.6 |
| Comp. Ex. 1 | 94.0 | 24.5 | 74.0 | 13.9 | 56 | 50 | 1.1 | 4.1 |
| Ex. 2 | 88.4 | 23.3 | 73.6 | 48.6 | 72 | 18 | 4.0 | 11.6 |
| Comp. Ex. 2 | 85.4 | 44.1 | 48.1 | 44.1 | 51 | 44 | 1.2 | 8.4 |
| Comp. Ex. 3 | 88.8 | 83.2 | 6.3 | 122.8 | 29 | 29 | 1.0 | 88.8 |
| Comp. Ex. 4 | 87.6 | 75.7 | 13.6 | 77.0 | 34 | 33 | 1.0 | 87.5 |
| Comp. Ex. 5 | 88.1 | 55.8 | 36.7 | 35.2 | 43 | 43 | 1.0 | 31.3 |
| Comp. Ex. 6 | 87.8 | 36.0 | 59.9 | 26.3 | 48 | 47 | 1.0 | 16.3 |
| Comp. Ex. 7 | 88.0 | 12.7 | 88.5 | 5.7 | 62 | 62 | 1.0 | 3.8 |
| Ex. 3 | 84.9 | 62.2 | 26.8 | 45.1 | 73 | 27 | 2.7 | 88.4 |
| Ex. 4 | 90.3 | 69.7 | 23.0 | 21.9 | 61 | 33 | 1.8 | 30.6 |
| Ex. 5 | 86.5 | 55.6 | 35.7 | 53.1 | 89 | 22 | 4.4 | 36.8 |

TABLE 2

| | Total light ray transmittance (%) | Parallel light ray transmittance (%) | Haze (%) | Glossiness (%) | Diffusivity DTv | Diffusivity DTh | Diffusivity ratio DTv/DTh | Transmittance T % v |
|---|---|---|---|---|---|---|---|---|
| Ex. 6 | 89.5 | 25.4 | 71.6 | 25.4 | 90 | 32 | 3.8 | 15.0 |
| Ex. 7 | 89.5 | 65.4 | 26.5 | 54.7 | 74 | 24 | 3.1 | 87.8 |
| Ex. 8 | 69.8 | 45.6 | 34.8 | 60.5 | 56 | 19 | 2.9 | 69.4 |
| Ex. 9 | 91.3 | 20.5 | 70.8 | 22.4 | 74 | 21 | 3.5 | 31.3 |
| Ex. 10 | 84.9 | 21.0 | 63.9 | 24.7 | 59 | 17 | 3.6 | 88.1 |
| Ex. 11 | 81.5 | 30.7 | 50.7 | 40.5 | 90 | 28 | 3.2 | 49.1 |
| Ex. 12 | 66.6 | 44.4 | 22.2 | 66.6 | 106 | 29 | 3.7 | 13.1 |
| Ex. 13 | 91.3 | 70.8 | 22.4 | 42.0 | 49 | 31 | 1.6 | 88.1 |
| Ex. 14 | 91.8 | 82.1 | 10.7 | 74.0 | 46 | 31 | 1.5 | 88.8 |

TABLE 3

| | Total light ray transmittance (%) | Parallel light ray transmittance (%) | Haze (%) | Glossiness (%) | Diffusivity DRv | Diffusivity DRh | Diffusivity ratio DRv/DRh | Reflectivity | Evaluation of reflecting property with the naked eye Reflection | Extension of Reflection | Resistance against the projection of a tube shade |
|---|---|---|---|---|---|---|---|---|---|---|---|
| Ex. 21 | 90.3 | 69.7 | 22.9 | 21.9 | 20.6 | 3.6 | 5.7 | 3.3 | o | o | o |
| Comp. Ex. 14 | — | — | — | — | 3.0 | 3.0 | 1.0 | >7.5 | o | x | x |
| Comp. Ex. 15 | 90.3 | 69.7 | 22.9 | 21.9 | 14.2 | 1.6 | 8.9 | 0.09 | x | Δ | o |
| Comp. Ex. 16 | 90.0 | 86.6 | 3.8 | 135.7 | 7.2 | 7.2 | 1.0 | 7.5 | o | x | x |
| Comp. Ex. 17 | 29.8 | 1.2 | 96.1 | 88.6 | 21.1 | 21.1 | 1.0 | 0.03 | x | o | o |
| Comp. Ex. 18 | 94.0 | 24.5 | 74.0 | 13.9 | 10.4 | 8.4 | 1.2 | 0.4 | x | Δ | o |
| Ex. 22 | 90.3 | 69.7 | 22.9 | 21.9 | 21.0 | 3.6 | 5.8 | 3.7 | o | o | o |
| Ex. 23 | 90.3 | 69.7 | 22.9 | 21.9 | 21.2 | 3.6 | 5.9 | 3.8 | o | o | o |

TABLE 3-continued

|  | Total light ray transmittance (%) | Parallel light ray transmittance (%) | Haze (%) | Glossiness (%) | Diffusivity DRv | Diffusivity DRh | Diffusivity ratio DRv/DRh | Reflectivity | Evaluation of reflecting property with the naked eye | | |
|---|---|---|---|---|---|---|---|---|---|---|---|
|  |  |  |  |  |  |  |  |  | Reflection | Extension of Reflection | Resistance against the projection of a tube shade |
| Ex. 24 | 90.3 | 69.7 | 22.9 | 21.9 | 20.6 | 3.6 | 5.7 | 3.2 | ○ | ○ | ○ |
| Ex. 25 | 88.4 | 23.3 | 73.6 | 48.6 | 22.6 | 4.7 | 4.8 | 0.9 | Δ | ○ | ○ |
| Comp. Ex. 19 | 85.4 | 44.1 | 48.1 | 44.1 | 13.6 | 13.6 | 1.0 | 0.3 | x | Δ | ○ |
| Comp. Ex. 20 | 88.3 | 79.0 | 9.8 | 148.2 | 4.5 | 4.5 | 1.0 | 6.5 | ○ | x | x |
| Comp. Ex. 21 | 88.8 | 83.2 | 6.3 | 122.8 | 4.6 | 4.6 | 1.0 | 7.3 | ○ | x | x |
| Comp. Ex. 22 | 87.6 | 75.7 | 13.6 | 77.0 | 5.3 | 5.3 | 1.0 | 7.3 | ○ | x | x |
| Comp. Ex. 23 | 88.1 | 55.8 | 36.7 | 35.2 | 9.6 | 9.6 | 1.0 | 1.7 | ○ | ○ | ○ |

TABLE 4

|  | Total light ray transmittance (%) | Parallel light ray transmittance (%) | Haze (%) | Glossiness (%) | Diffusivity DRv | Diffusivity DRh | Diffusivity ratio DRv/DRh | Reflectivity | Evaluation of reflecting property with the naked eye | | |
|---|---|---|---|---|---|---|---|---|---|---|---|
|  |  |  |  |  |  |  |  |  | Reflection | Extension of Reflection | Resistance against the projection of a tube shade |
| Comp. Ex. 24 | 87.8 | 36.0 | 59.9 | 26.3 | 9.1 | 8.7 | 1.04 | 1.0 | Δ | Δ | ○ |
| Comp. Ex. 25 | 88.0 | 12.7 | 88.5 | 5.7 | 13.8 | 13.8 | 1.0 | 0.2 | x | Δ | ○ |
| Comp. Ex. 26 | 5.7 | 0.2 | 96.6 | 69.8 | 13.2 | 13.2 | 1.0 | 0.1 | x | Δ | ○ |
| Comp. Ex. 27 | 27.6 | 1.0 | 96.5 | 71.3 | 21.8 | 21.8 | 1.0 | 0.2 | x | ○ | ○ |
| Ex. 26 | 84.9 | 62.2 | 26.8 | 45.1 | 16.5 | 4.2 | 3.9 | 5.8 | ○ | ○ | ○ |
| Ex. 27 | 90.3 | 69.7 | 23.0 | 21.9 | 13.3 | 4.2 | 3.2 | 2.3 | ○ | Δ | ○ |
| Ex. 28 | 90.3 | 69.7 | 23.0 | 21.9 | 12.9 | 3.8 | 3.4 | 3.1 | ○ | Δ | ○ |
| Ex. 29 | 86.8 | 53.1 | 38.6 | 26.8 | 22.2 | 3.2 | 6.9 | 1.0 | Δ | ○ | ○ |
| Ex. 30 | 86.5 | 55.6 | 35.7 | 53.1 | 21.8 | 3.4 | 6.4 | 1.6 | ○ | ○ | ○ |
| Ex. 31 | 89.5 | 25.4 | 71.6 | 25.4 | 21.0 | 5.2 | 4.0 | 0.6 | Δ | ○ | ○ |
| Ex. 32 | 89.0 | 65.4 | 26.5 | 54.7 | 21.0 | 4.0 | 5.3 | 5.4 | ○ | ○ | ○ |
| Ex. 33 | 69.8 | 45.6 | 34.8 | 60.5 | 26.0 | 3.6 | 7.2 | 5.8 | ○ | ○ | ○ |
| Ex. 34 | 87.4 | 22.0 | 74.8 | 22.0 | 25.7 | 5.8 | 4.4 | 0.8 | Δ | ○ | ○ |

TABLE 5

| Reference Example | Reflectivity | Diffusivity |
|---|---|---|
| Commercially available white reflecting polyester film 1 | 0.03 | 22.2 |
| Commercially available white reflecting polyester film 2 | 0.08 | 20.7 |
| Commercially available white reflecting polyester film 3 | 0.03 | 22.2 |

TABLE 6

| Kind of light-reflecting laminate | Illuminance (lux) | Glaringness of reflected light |
|---|---|---|
| Ex. 21 | 1400 | Extremely mild |
| Ex. 26 | 2000 | Extremely mild |
| Ex. 27 | 1300 | Extremely mild |
| Ex. 30 | 910 | Extremely mild |
| Comp. Ex. 14 | 2300 | Glaring |
| Comp. Ex. 18 | 560 | Mild |
| Comp. Ex. 26 | 110 | Extremely mild |
| Ref. Ex. 4 | 120 | Extremely mild |

Example 35

An anisotropic light-diffusing film containing a continuous phase and dispersed phases was yielded in the same way as in Example 1 except that in the process of Example 1, the resin composition was changed to a kneaded polyolefin resin composition yielded by melt-extruding, previously in a biaxial extruder, 50 parts by mass of a polypropylene resin (NOR-BLENE FS2011DG3, manufactured by Sumitomo Chemical Co., Ltd.), 30 parts by mass of an ethylene/butene copolymer (TOUGHMER A0585X, manufactured by Mitsui Chemicals, Inc.), and 20 parts by mass of a nanocrystal-structure-controlled polyolefin elastomer resin (NOTIO PN3560, manufactured by Mitsui Chemicals, Inc.). The anisotropic light-diffusing film yielded in the present example was excellent in each of transmittance, diffusivity, and diffusivity ratio. Thus, the film was high in quality (Table 7).

Example 36

A tenter type drawing machine was used to heat the monoaxially drawn film prepared in Example 35 further at 158° C. and then draw the film 3.5 times in the transverse direction at a drawing temperature of 145° C. to yield an anisotropic light-diffusing film. The anisotropic light-diffusing film yielded in the present example was excellent in each of transmittance, diffusivity, and diffusivity ratio, and further had a good external appearance. Thus, the film was high in quality (Table 7).

Example 37

Two films of the anisotropic light-diffusing film yielded in Example 36 were put onto each other, and then optical properties thereof were measured. The resultant anisotropic light-diffusing film was better in diffusivity than the anisotropic light-diffusing film yielded in Example 36 (Table 7).

Example 38

An anisotropic light-diffusing film was yielded in the same way as in Example 35 except that in the process of Example 35, the blend composition of the polyolefin resin was changed to 53 parts by mass of a polypropylene resin (NORBLENE FS2011DG3, manufactured by Sumitomo Chemical Co., Ltd.), 28 parts by mass of an ethylene/butene copolymer (TOUGHMER A1085S, manufactured by Mitsui Chemicals, Inc.), and 19 parts by mass of a nanocrystal-structure-controlled polyolefin elastomer resin (NOTIO PN3560, manufactured by Mitsui Chemicals, Inc.). The anisotropic light-diffusing film yielded in the present example was excellent in each of transmittance, diffusivity, and diffusivity ratio, and further had a good external appearance. Thus, the film was high in quality (Table 7).

Example 39

A tenter type drawing machine was used to heat the monoaxially drawn film prepared in Example 38 further at 158° C. and then draw the film 3.5 times in the transverse direction at a drawing temperature of 145° C. to yield an anisotropic light-diffusing film. Four films of the resultant light-diffusing film were laminated onto each other, and properties thereof were evaluated and shown in Table 7. The anisotropic light-diffusing film yielded in the present example was excellent in each of transmittance, diffusivity, and diffusivity ratio, and further had a good external appearance. Thus, the film was high in quality.

Example 40

An anisotropic light-diffusing film containing a continuous phase and dispersed phases was yielded in the same way as in Example 35 except that in the process of Example 35, the blend composition of the polyolefin resin was changed to 35 parts by mass of a polypropylene resin (NORBLENE FS2011DG3, manufactured by Sumitomo Chemical Co., Ltd.), 46 parts by mass of an ethylene/butene copolymer (TOUGHMER A1085S, manufactured by Mitsui Chemicals, Inc.), and 19 parts by mass of a nanocrystal-structure-controlled polyolefin elastomer resin (NOTIO PN3560, manufactured by Mitsui Chemicals, Inc.). The anisotropic light-diffusing film yielded in the present example was excellent in each of transmittance, diffusivity, and diffusivity ratio, and further had a good external appearance. Thus, the film was high in quality (Table 7).

Example 41

An anisotropic light-diffusing film containing a continuous phase and dispersed phases was yielded in the same way as in Example 39 except that in the process of Example 39, the blend composition of the polyolefin resin was changed to 53 parts by mass of a polypropylene resin (NORBLENE FS2011DG3, manufactured by Sumitomo Chemical Co., Ltd.), 28 parts by mass of a high-density polyethylene resin (HI-ZEX 2208J, manufactured by Prime Polymer Co., Ltd.), and 19 parts by mass of a nanocrystal-structure-controlled polyolefin elastomer resin (NOTIO PN3560, manufactured by Mitsui Chemicals, Inc.). The anisotropic light-diffusing film yielded in the present example was excellent in each of transmittance, diffusivity, and diffusivity ratio, and further had a good external appearance. Thus, the film was high in quality (Table 7).

The anisotropic light-diffusing films yielded in Examples 35 to 41 described above have good characteristics of being as good in optical properties as, for example, the anisotropic light-diffusing film yielded in Example 4, and being further good in external appearance.

Example 42

Three films of the anisotropic light-diffusing film yielded in Example 39 were put onto each other, and properties thereof were measured. The properties are shown in Table 7. The anisotropic light-diffusing film of the present example was better in diffusivity than the anisotropic light-diffusing film yielded in Example 35.

Examples 43 and 44

The anisotropic light-diffusing films of Examples 31 and 36 were each bonded onto an acrylic plate having a thickness of 2 mm and a total light ray transmittance of 93% through an optical double-sided pressure sensitive adhesive sheet interposed therebetween to yield an anisotropic light-diffusing laminate. The resultant anisotropic light-diffusing laminate was used as a diffusing plate of a fluorescent lamp. In this case, the laminate was set to make the main diffusion direction of its anisotropic light-diffusing film parallel to the length direction of the fluorescent lamp. The laminate was high in brightness, and good in diffusivity, so that no tube shade of the fluorescent lamp was viewed.

Example 45

The anisotropic light-diffusing film yielded in Example 35 was bonded onto a dot-type light-conducting plate wherein a single fluorescent lamp as an edge light and a white reflecting plate were used through an optical double-sided pressure sensitive adhesive tape interposed therebetween, so as to make the main diffusion direction of the film parallel to the length direction of the fluorescent lamp. The brightness thereof was then measured at a position which was separated 40 cm apart from the front surface of the light-conducting plate and was just above the light-conducting plate, using a Topcon spectroscopic radiometer SR-3A manufactured by Topcon Technohouse Corporation.

The brightness was 1.5 $Cd/m^2 \times 10^2$. However, when the anisotropic light-diffusing film was not bonded thereto, the brightness was 0.3 $Cd/m^2 \times 10^2$.

Example 46

In the same manner as in Example 45, the brightness was measured except that in the process of Example 45, two films of the anisotropic light-diffusing film yielded in Example 35 were put and bonded onto each other in the same direction as in Example 45. The brightness was 2.3 $Cd/m^2 \times 10^2$, and was even better than that of Example 45.

Examples 47 and 48

In the same manner as in Example 11, the brightness was measured except that in the process of Example 45, the two anisotropic light-diffusing films of each of Examples 38 and 40 were put onto each other in the same direction as in Example 45. The resultant brightnesses were 2.0 and 1.3 $Cd/m^2 \times 10^2$, respectively. In the same manner as about the anisotropic light-diffusing film yielded in Example 35, the brightness-improving effect was large.

Example 49

Light Reflector Containing Metallic Layer

Prepared was an aluminum-metal-deposited polyester film wherein metallic aluminum was vapor-deposited into a thickness of 80 nm on a biaxially drawn polyester film (A4300, 100 µm) manufactured by Toyobo Co., Ltd.

[Preparation of an Anisotropic Light-Reflecting Laminate]

The anisotropic light-diffusing film prepared in Example 35 was bonded onto the aluminum-deposited surface of the aluminum-metal-deposited film through an optical double-sided pressure sensitive adhesive sheet interposed therebetween. The diffusivity ratio of the anisotropic light-reflecting laminate was 5.7. Characteristics of the anisotropic light-reflecting laminate are shown in Table 8. The light-reflecting laminate yielded in the present example was excellent in both of reflectivity and diffusivity, and the anisotropy of light diffusion was high. Thus, the laminate was high in quality.

Example 50

An anisotropic light-reflecting laminate was yielded in the same way as in Example 49 except that a reflection-enhancing type aluminum reflecting plate (V95-110) manufactured by Almeco was used as the light reflector containing a metallic layer in the process of Example 49. Characteristics are shown in Table 8. The light-reflecting laminate yielded in the present example had a better reflecting property than the anisotropic light-reflecting laminate yielded in Example 49. Thus, the laminate was high in quality.

Example 51

An anisotropic light-reflecting laminate was yielded in the same way as in Example 49 except that a polyester film wherein metallic silver was laminated into a thickness of 150 nm on a biaxially drawn polyester film (A4300, 100 µm) manufactured by Toyobo Co., Ltd. by sputtering was used as the light reflector in the process of Example 49. Characteristics are shown in Table 8. The light-reflecting laminate yielded in the present example had a better reflecting property than the anisotropic light-reflecting laminate yielded in Example 49. Thus, the laminate was high in quality.

Example 52

An anisotropic light-reflecting laminate was yielded by vapor-depositing metallic aluminum into a thickness of 150 nm onto a singe surface of the anisotropic light-diffusing film prepared in the process of Example 35. The light-reflecting laminate yielded in the present example had a reflecting property equivalent to the light-reflecting laminate yielded in Example 49. Thus, the laminate was high in quality (Table 8).

Example 53

An anisotropic light reflecting laminate was yielded in the same way as in Example 49 except that the anisotropic light-diffusing film in the process of Example 49 was changed to the anisotropic light-diffusing film yielded in Example 36. The light-reflecting laminate yielded in the present example was excellent in both of reflectivity and diffusivity, and was high in the anisotropy of light diffusion. Thus, the laminate was high in quality (Table 8).

Examples 54 to 58

An anisotropic light-reflecting laminate was yielded in the same way as in Example 49 except that the anisotropic light-diffusing film in the processes of Example 49 was changed to each of the anisotropic light-diffusing films yielded in Examples 37 to 41. All of the light-reflecting laminates yielded in these present examples were excellent in both reflectivity and diffusivity, and were high in the anisotropy of light diffusion. Thus, the laminates were high in quality (Table 8).

TABLE 7

|  | Total light ray transmittance (%) | Parallel light ray transmittance (%) | Haze (%) | Glossiness (%) | Diffusivity DTv | Diffusivity DTh | Diffusivity ratio DTv/DTh | Transmittance T % v | External appearance |
|---|---|---|---|---|---|---|---|---|---|
| Ex. 35 | 88.6 | 69.8 | 21.0 | 63.7 | 80 | 21 | 3.8 | 60.5 | Good |
| Ex. 36 | 90.1 | 74.1 | 17.7 | 63.7 | 68 | 24 | 2.8 | 87.5 | Good |
| Ex. 37 | 88.1 | 65.5 | 21.0 | 60.5 | 76 | 26 | 3.0 | 36.0 | Good |
| Ex. 38 | 87.4 | 61.0 | 30.2 | 42.6 | 65 | 24 | 2.7 | 86.1 | Good |
| Ex. 39 | 89.1 | 70.5 | 17.5 | 65.0 | 61 | 25 | 2.4 | 56.3 | Good |
| Ex. 40 | 87.6 | 67.8 | 22.5 | 42.7 | 62 | 16 | 4.0 | 62.2 | Good |
| Ex. 41 | 55.3 | 21.1 | 61.9 | 69.0 | 73 | 18 | 4.1 | 83.4 | Good |
| Ex. 42 | 71.2 | 50.1 | 60.0 | 60.1 | 108 | 25 | 4.3 | 12.0 | Good |

TABLE 8

|  | Total light ray transmittance (%) | Parallel light ray transmittance (%) | Haze (%) | Glossiness (%) | Diffusivity DRv | Diffusivity DRh | Diffusivity ratio DRv/DRh | Reflectivity | Evaluation of reflecting property with the naked eye | | |
|---|---|---|---|---|---|---|---|---|---|---|---|
|  |  |  |  |  |  |  |  |  | Reflection | Extension of Reflection | Resistance against the projection of a tube shade |
| Ex. 49 | 88.6 | 69.8 | 21.0 | 63.8 | 15.3 | 3.8 | 4.0 | 5.8 | ○ | ○ | ○ |
| Ex. 50 | 88.6 | 69.8 | 21.0 | 63.8 | 16.0 | 3.8 | 4.2 | 5.9 | ○ | ○ | ○ |
| Ex. 51 | 88.6 | 69.8 | 21.0 | 63.8 | 15.4 | 3.8 | 4.0 | 6.0 | ○ | ○ | ○ |
| Ex. 52 | 88.6 | 69.8 | 21.0 | 63.8 | 15.3 | 3.8 | 4.0 | 5.8 | ○ | ○ | ○ |
| Ex. 53 | 90.1 | 74.1 | 17.7 | 63.7 | 11.6 | 3.9 | 3.3 | 5.7 | ○ | ○ | ○ |
| Ex. 54 | 88.1 | 65.5 | 21.0 | 60.5 | 12.6 | 6.8 | 1.9 | 3.3 | ○ | ○ | ○ |
| Ex. 55 | 87.1 | 61.0 | 30.2 | 42.6 | 19.6 | 4.0 | 4.9 | 4.4 | ○ | ○ | ○ |

TABLE 8-continued

| | Total light ray transmittance (%) | Parallel light ray transmittance (%) | Haze (%) | Glossiness (%) | Diffusivity DRv | Diffusivity DRh | Diffusivity ratio DRv/DRh | Reflectivity | Evaluation of reflecting property with the naked eye | | |
|---|---|---|---|---|---|---|---|---|---|---|---|
| | | | | | | | | | Reflection | Extension of Reflection | Resistance against the projection of a tube shade |
| Ex. 56 | 89.1 | 70.5 | 17.5 | 65.0 | 10.7 | 3.8 | 2.8 | 3.6 | ○ | ○ | ○ |
| Ex. 57 | 87.6 | 67.8 | 22.5 | 42.7 | 18.9 | 3.0 | 6.3 | 5.1 | ○ | ○ | ○ |
| Ex. 59 | 55.3 | 21.1 | 61.9 | 69.0 | 24.9 | 3.0 | 8.3 | 4.4 | ○ | ○ | ○ |

INDUSTRIAL APPLICABILITY

The anisotropic light-diffusing film and the anisotropic light-diffusing laminate of the invention are high in both of light transmittance and diffusivity; thus, when the film and laminate are each used as a diffusing film in a lighting equipment, a display, a light conducting plate of an advertising lamp, or the like, a high illuminance and brightness and an even illuminance and brightness can be obtained.

The anisotropic light-diffusing film and the anisotropic light-diffusing laminate of the invention have anisotropic light-diffusivity; thus, for example, when the anisotropic light-diffusing film is used in the state of being arranged to make a direction along which the extension of diffusion through the anisotropic light-diffusing film is large orthogonal to a direction along which the direction of the anisotropy based on the shape of a light source is cancelled, the above-mentioned advantageous effect can be exhibited at a higher level.

The anisotropic light-reflecting laminate of the invention is high in both of reflectivity and diffusivity when light is reflected thereon; thus, in indoor lighting, lighting in an internal-lighting type illumination panel, light radiation in a copying machine, lighting in a liquid crystal display device, or some other lighting that may be of various types, the light quantity of a light source therefor is effectively used, so that the illuminance or the brightness in the lighting can be made high.

Since the laminate is high in both of reflectivity and diffusivity, it can also be said that the laminate has an excellent reflective property having both of an intense reflectivity of a light reflector having metallic luster, and a mild reflection which is possessed by a white reflecting film. It is therefore possible to maintain high illuminance or brightness, and give such a mild illumination that glaringness is restrained, the illumination being desired in indoor lighting, lighting in an internal-lighting type illumination panel, or the like. That is, energy saving and the sufficiency of sensitive impression, which are desired in the present market, can be made compatible with each other.

The anisotropic light-reflecting laminate of the invention has the above-mentioned property in the reflection of light entering the laminate at a low angle. Thus, the laminate is suitable for, for example, a light reflector of a reflective liquid crystal display device.

About the anisotropic light-reflecting laminate of the invention, light reflected thereon has anisotropy, so that the laminate has a function of concentrating the reflected light into a specific direction. Thus, when the laminate is arranged to satisfy a positional relationship adapted for the shape of a light source, the reflectivity of the reflected light or the evenness of the reflectivity can be improved.

Accordingly, in indoor lighting, lighting in an internal-lighting type illumination panel, light radiation in a copying machine, lighting in a display device such as a liquid crystal display device, or some other lighting that may be of various types, the light quantity of its light source can be effectively reflected. Thus, in the above lighting, the illuminance or brightness can be made high.

In the laminate wherein a surface of a light reflector is covered with the anisotropic light-diffusing film of the invention, light reflected thereon has anisotropic diffusivity; thus, when the laminate is used in the state of being arranged to make the direction of the anisotropy of the anisotropic light-diffusing film consistent with a direction along which the direction of the anisotropy based on the shape of a light source is cancelled, the above effect can be exerted more highly.

Furthermore, the anisotropic light-diffusing film of the invention is produced by melt-extruding a mixture of two thermoplastic resins into a film form, and fine particles as a non-melting light-diffusivity supplier are not blended therewith; thus, the resultant film is high in clearness, the economical efficiency is high, and the film can also be used comprehensively in the fields of light-diffusion application and light-reflection application.

EXPLANATION OF REFERENCE NUMBER

1: optically modulating layer (polarizing plate or retardation plate)
2: glass substrate
3: transparent electrode
4: insulating layer
5: orientation layer
6: liquid crystal layer
7: orientation layer
8: transparent electrode
10: color filter layer
11: intervened transparent layer
12: light reflector (sample film)
13: glass substrate

The invention claimed is:
1. An anisotropic light-diffusing film which is obtained by melt-extruding a mixture containing at least two thermoplastic resins incompatible with each other and comprises a structure containing a continuous phase and dispersed phases, and/or a co-continuous-phase structure,
wherein
the parallel light ray transmittance of the film is from 20 to 85%,
the haze of the film is from 10 to 80%,
the glossiness of the film is from 10 to 70%, and further
the transmitted light diffusivity ratio of the film is from 1.3 to 6.0,
the ratio (DTv/DTh) being the ratio of the diffusivity of transmitted light (DTv) which is measured with an angle-variable photometer when the incidence angle is set to 60 degrees in the state where a sample is fixed to set the orientation direction of the dispersed phases or the co-continuous-phase of the film to the vertical direction when measured by confocal laser microscopy to the diffusivity of transmitted light (DTh) measured in the above-mentioned same manner in the state where the sample is fixed to set the orientation direction of the dispersed phases or the co-continuous-phase of the film to the horizontal direction when measured by confocal laser microscopy,
wherein, for the measurement of DTv and DTh, the angle-variable photometer is a Murakami Color Research Laboratory Co., Ltd. Model GP-200 automatic angle-variable photometer which is used to determine angle range from a starting angle of a rise of a transmission peak to an ending angle of a fall thereof, and wherein the transmission peak is measured under the following conditions in a transmission measuring mode: light source: illuminant A; light ray incidence angle: 60°; light-receiving angle: −90° to 90°; sensitivity: 150; high volton: 500; filter: ND10; light bundle lens stop: 10.5 mm; light-receiving lens stop: 9.1 mm; and angle-varying interval: 0.1 degree.

2. The anisotropic light-diffusing film according to claim 1, wherein the DTv, and the transmittance (T%v) of the film which is measured in the state where the sample is fixed to set the orientation direction of the dispersed phases or the co-continuous-phase of the film to the vertical direction satisfy the following expression (1) or (2):

$$60 < DTv \leq 120, 10 \leq T\%v \leq 90 \tag{1}$$

$$35 \leq DTv \leq 60, -3.2 \times DTv + 203 \leq T\%v \leq 90 \tag{2}.$$

3. The anisotropic light-diffusing film according to claim 1, wherein one of the at least two thermoplastic resins is a crystalline resin.

4. The anisotropic light-diffusing film according to claim 3, wherein the crystalline resin comprises a polypropylene resin.

5. The anisotropic light-diffusing film according to claim 3, wherein the crystalline resin comprises a polyester resin.

6. The anisotropic light-diffusing film according claim 3, wherein one of the at least two thermoplastic resins comprises a polyolefin resin containing ethylene and/or butene.

7. The anisotropic light-diffusing film according to claim 1, wherein the mixture, which contains the at least two thermoplastic resins, comprises a blend of a polypropylene resin (A), a polyolefin resin (B) containing ethylene and/or butene, and a nanocrystal-structure-controlled polyolefin elastomer resin (C).

8. An anisotropic light-diffusing laminate, comprising:
the anisotropic light-diffusing film as recited in claim 1 and a plastic sheet which is laminated over the film and has a thickness of 0.1 to 5 mm and a total light ray transmittance of 80 to 100%.

9. An anisotropic light-reflecting laminate, comprising a light reflector containing a metallic layer, and the anisotropic light-diffusing film as recited in claim 1 which is laminated over at least one surface of the light reflector, wherein the reflected light diffusivity ratio of the laminate is from 1.3 to 10,
the ratio (DRv/DRh) being the ratio of the diffusivity of reflected light (DRv) which is measured with an angle-variable photometer when the incidence angle is set to 15 degrees in the state where a sample is fixed to set the orientation direction of the dispersed phases or the co-continuous-phase of the film to the vertical direction when measured by confocal laser microscopy to the diffusivity of reflected light (DRh) measured in the above-mentioned same manner in the state where the sample is fixed to set the orientation direction of the dispersed phases or the co-continuous-phase of the film to the horizontal lateral direction when measured by confocal laser microscopy; and
the reflectivity and the diffusivity of the diffusing film side of the laminate are from 0.5 to 8 and from 10 to 30, respectively,
wherein, for the measurement of DRv and DRh, the angle-variable photometer is a Murakami Color Research Laboratory Co., Ltd. Model GP-200 automatic angle-variable photometer which is used to determine angle range from a starting angle of a rise of a reflection peak to an ending angle of a fall thereof, and wherein the reflection peak is measured under the following conditions in a reflection mode: light source: illuminant A; light ray incidence angle: 15°; light-receiving angle: −90° to 90°; sensitivity: 150; high volton: 500; filter: ND10; light bundle lens stop: 10.5 mm; light-receiving lens stop: 9.1 mm; and angle-varying interval: 0.1 degree.

10. A lighting equipment, comprising the anisotropic light-diffusing film as recited in claim 1.

11. A display device, comprising the anisotropic light-diffusing film as recited in claim 1.

12. A lighting equipment, comprising the anisotropic light-diffusing laminate as recited in claim 8.

13. A lighting equipment, comprising the anisotropic light-reflecting laminate as recited in claim 9.

14. A display device, comprising the anisotropic light-diffusing laminate as recited in claim 8.

15. A display device, comprising the anisotropic light-reflecting laminate as recited in claim 9.

* * * * *